US008651059B2

(12) United States Patent
Cartwright et al.

(10) Patent No.: US 8,651,059 B2
(45) Date of Patent: Feb. 18, 2014

(54) FINFISH CONTAINMENT PENS AND POLYHEDRAL STRUCTURES

(75) Inventors: Paul Cartwright, Camden, ME (US); Stephen H. Page, Searsmont, ME (US)

(73) Assignee: Ocean Farm Technologies, Inc., Morrill, ME (US)

( * ) Notice: Subject to any disclaimer, the term of this patent is extended or adjusted under 35 U.S.C. 154(b) by 0 days.

(21) Appl. No.: 13/603,814

(22) Filed: Sep. 5, 2012

(65) Prior Publication Data

US 2012/0325161 A1 Dec. 27, 2012

Related U.S. Application Data

(62) Division of application No. 11/404,383, filed on Apr. 14, 2006.

(60) Provisional application No. 60/671,861, filed on Apr. 14, 2005.

(51) Int. Cl.
*A01K 61/00* (2006.01)
(52) U.S. Cl.
USPC .......................................................... 119/223
(58) Field of Classification Search
USPC ......... 119/223, 215, 216, 219, 226, 228, 203, 119/221, 239, 240, 238, 208, 209, 256; 43/102, 103, 104, 100; 52/81.2, 81.1, 52/80.1, 81.3
See application file for complete search history.

(56) References Cited

U.S. PATENT DOCUMENTS

| | | | |
|---|---|---|---|
| 1,054,880 A | 3/1913 | Svoboda | |
| 4,244,323 A | 1/1981 | Morimura | |
| 4,257,350 A * | 3/1981 | Streichenberger | 119/223 |
| 4,312,296 A * | 1/1982 | Stelleman et al. | 119/223 |
| 4,380,213 A | 4/1983 | Blair et al. | |
| 4,957,064 A | 9/1990 | Korna | |
| 5,207,017 A | 5/1993 | Litrico | |
| 5,251,571 A * | 10/1993 | Willinsky et al. | 119/215 |
| 5,299,530 A | 4/1994 | Mukadam et al. | |
| 5,412,903 A * | 5/1995 | Zemach et al. | 43/102 |

(Continued)

FOREIGN PATENT DOCUMENTS

| | | |
|---|---|---|
| AU | 637128 | 5/1993 |
| EP | 0060792 | 9/1982 |

(Continued)

OTHER PUBLICATIONS

Net Systems (Washington), The Submersible Sea Station™, www.oceanspar.com/seastation.htm, 2004, printed from Internet Nov. 29, 2004.

(Continued)

*Primary Examiner* — T. Nguyen

(57) ABSTRACT

A finfish aquaculture containment pen having a plurality of panels that when joined together form the majority of the exterior surface of the containment pen. The panels each comprise tension-bearing mesh material forming the exterior surface of the containment pen, a plurality of compression-bearing struts extending along the boundaries between panels, wherein the mesh material is attached to the struts along the lengths of the struts, and a plurality of hubs at which a plurality of struts and the corners of a plurality of panels abut each other. The panels can form a polyhedral structure. The mesh can comprise coated wire mesh. The struts can be curved members with convex curvature.

24 Claims, 21 Drawing Sheets

(56) References Cited

U.S. PATENT DOCUMENTS

| | | | |
|---|---|---|---|
| 5,438,958 A * | 8/1995 | Ericsson et al. | 119/223 |
| 5,617,813 A * | 4/1997 | Loverich et al. | 119/223 |
| 5,628,279 A * | 5/1997 | Bones, IV | 119/215 |
| 5,704,169 A * | 1/1998 | Richter | 52/81.2 |
| 5,713,303 A * | 2/1998 | Willinsky et al. | 119/218 |
| 6,282,849 B1 * | 9/2001 | Tuczek | 52/81.1 |
| 6,386,146 B1 * | 5/2002 | Knott, Sr. | 119/223 |
| 6,481,378 B1 * | 11/2002 | Zemach | 119/223 |
| 6,520,115 B2 * | 2/2003 | Boyd | 119/223 |
| 6,628,279 B1 | 9/2003 | Schell et al. | |
| 6,679,644 B1 | 1/2004 | Heller | |
| 7,284,501 B2 | 10/2007 | Page | |
| 2006/0096548 A1 * | 5/2006 | Ytterland et al. | 119/223 |
| 2006/0102087 A1 * | 5/2006 | Page | 119/223 |

FOREIGN PATENT DOCUMENTS

| | | |
|---|---|---|
| FR | 2531835 | 2/1984 |
| GB | 2031251 | 4/1980 |
| WO | 89/12388 | 12/1989 |
| WO | 92/03921 | 3/1992 |
| WO | 93/06720 | 4/1993 |
| WO | 95/14374 | 6/1995 |
| WO | 2004/073396 | 9/2004 |

OTHER PUBLICATIONS

Net Systems (Washington), Raccolta casi Working Model visual Nastran NETSystems, www.atnet.itllistalcasnets.htm printed from Internet Nov. 29, 2004.

Farmocean International (Sweden), Open the Door to Industrial Offshore Aqua Culture, www.farmocean.se/indexA.htm, printed from Internet Nov. 29, 2004.

Bonnar Engineering/Dunlop Oil and Marine (Ireland), Dunlop Tempest, www.bonnarene:ltd.ie/marine.htm. printed from Internet 11130/04.

Sadco-ShelfLtd. (Russia), Products Brochure, (Nov. 20, 2000), www.sadcoshelf.so.rulene:lish/eo02 or.htm printed from Internet Nov. 30, 2004.

* cited by examiner

FINFISH CONTAINMENT PENS AND POLYHEDRAL STRUCTURES

CROSS-REFERENCE TO RELATED APPLICATIONS

This application is a divisional application of and claims priority to U.S. application Ser. No. 11/404,383, filed Apr. 14, 2006, which application claims priority to U.S. Provisional Application Ser. No. 60/671,861, filed Apr. 14, 2005. Both applications are hereby incorporated by reference.

TECHNICAL FIELD

This invention relates to finfish containment pens and to polyhedral structures useful for such pens.

BACKGROUND

Polyhedral three-dimensional structures such as geodesic domes have been used for a variety of purposes. Their use has been limited, however, due to difficulty in assembling and fastening together their component parts. These structures offer great advantages in efficient use of materials, but these advantages have been offset by the complexity involved in their construction, including the concentration of stress at fasteners and the fact that the straight columnar strut elements (or flat planar elements) that typically comprise these structures have a practical size limit.

There are a variety of applications in which polyhedral three-dimensional structures might be used to great advantage if these construction difficulties could be overcome. Marine finfish aquaculture is one of these. The pending application of Stephen H. Page, filed on Oct. 29, 2004, application Ser. No. 10/976,641, entitled "Containment Pens for Finfish Aquaculture" (hereinafter referred to as "Page", and incorporated herein by reference) describes polyhedral containment pens for finfish aquaculture. As Page discloses, there is a need for a predator-resistant, inexpensive, off-shore-deployable, large volume, low maintenance containment system for the practice of aquaculture.

Page discloses a polyhedral containment pen composed of triangular panels that fit together to form a sphere (referred to as a geodesic structure). Each panel consists of three strut elements forming a triangular structure with a mesh or net stretched over and attached to it. These panels, when fitted together, form a polyhedral spherical net enclosure. Bolts or other mechanical fasteners are suggested for joining panels together.

SUMMARY

In a first aspect, the invention features a three dimensional space enclosing polyhedral structure, comprising a plurality of panels that when joined together form the exterior surface of the structure, the panels each comprising a two dimensionally stable sheet material forming the exterior surface of the structure, a plurality of convexly curved struts extending along the boundaries between panels, wherein the sheet material is attached to the struts along the lengths of the struts, and a plurality of hubs at which a plurality of struts and the corners of a plurality of panels abut each other, wherein the curved struts serve as arches to carry compression loads and the panels provide tensile loading and serve as lateral and vertical bracing for the arches.

Preferred implementations of this aspect of the invention may incorporate one or more of the following.

The panels may comprise struts joined at the corners, and the struts of adjoining panels generally may abut along the lengths of the struts.

The panels may be cast or molded and may be substantially one piece.

The structure may be configured to be a finfish containment pen.

The panels may be triangular, and may be comprised principally of three struts joined at three corners.

At least some of the panels may comprise pentagons or hexagons.

The structure may be generally hemispherical and may be configured as a finfish containment pen with the hemispherical shape generally submerged, and the open side facing upwardly.

The panels may each comprise tension-bearing mesh material forming the exterior surface of the containment pen.

The struts may be compression-bearing struts extending along the boundaries between panels, and wherein the mesh material may be attached to the struts along the lengths of the struts.

The mesh material may comprise wire mesh.

The mesh material may comprise coated wire mesh.

The struts may be configured so that when loaded in compression the struts tend to buckle outwardly from the interior of the pen, and wherein the mesh may be attached to the struts in such a manner as to resist such outward buckling.

Curvature of the struts approximately may match the curvature of the polyhedral structure.

The polyhedral structure may be approximately spherical.

The panels may be approximately triangular with approximately triangular pieces of mesh material extending across each panel, some portions of the triangular pieces may be approximately flat and some portions may be developed surfaces.

The hubs may be configured to be expanded in a direction away from the center line of the hub to apply compression loads to the struts and tension loads to the sheet material.

The curved struts may form structural arches braced both laterally and vertically by the sheet material.

The struts may carry primarily compression loads and the sheet material may carry primarily tensile loads.

Deformation of the struts may be limited by the tensile loads applied to the struts by the sheet material.

The struts and mesh material may be configured so that the mesh material is attached to the struts before the panels are placed in position in the polyhedral structure.

The hubs may be configured to expand in a direction away from the center line of the hub to put compression loads on the struts extending between hubs.

Among the many advantages of the invention (some of which may be achieved only in some of its various aspects and implementations) are the following:

The invention may be used to construct finfish containment systems that are relatively easy and safe to work with, that are readily transportable both prior to assembly and after assembly, that are durable and require relatively little maintenance, and that have a low life-cycle cost.

The invention makes it possible to achieve in man-made polyhedral structures a working, redistributable balance between tensile and compressive forces in the structure, something that may be found in some naturally occurring polyhedral structures, but not in man-made structures.

The curved strut implementations allow for a much larger, more lightly built fish containment pen that is remarkably strong. Having fewer, more slender struts reduces current drag on the pen, in turn reducing the strength requirements.

The design also allows for simplified manufacturing, compact shipping, simplified assembly, simplified deployment, and reductions in labor cost. While there is some cost involved in initial tooling for some implementations—e.g., tooling to make the extruded strut section, the molded hub-locks, and the wire mesh panels with formed edges—once set up for production there is very little labor or material cost.

The components can be very simple: curved struts, wire panels, and hub hardware (e.g., tapered hub element, bolt, and washer). In the case of a modified 3V icosahedron, which is suitable for a 100' diameter fish pen, there are only two strut lengths, and a total of only 180 struts. There are 90 mesh panels, and 92 sets of hub hardware. The respective parts may be mass produced and stacked compactly for shipment. The curved struts may be nested, and the mesh panels, with only a 1.25" depth, may be nested and stacked efficiently.

Any strut or wire mesh panel can be replaced, on site, in the water. Replacement is quick and simple, because it requires removing literally one or two bolts. Because there are typically only a few different parts, only a small spare parts inventory is necessary.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
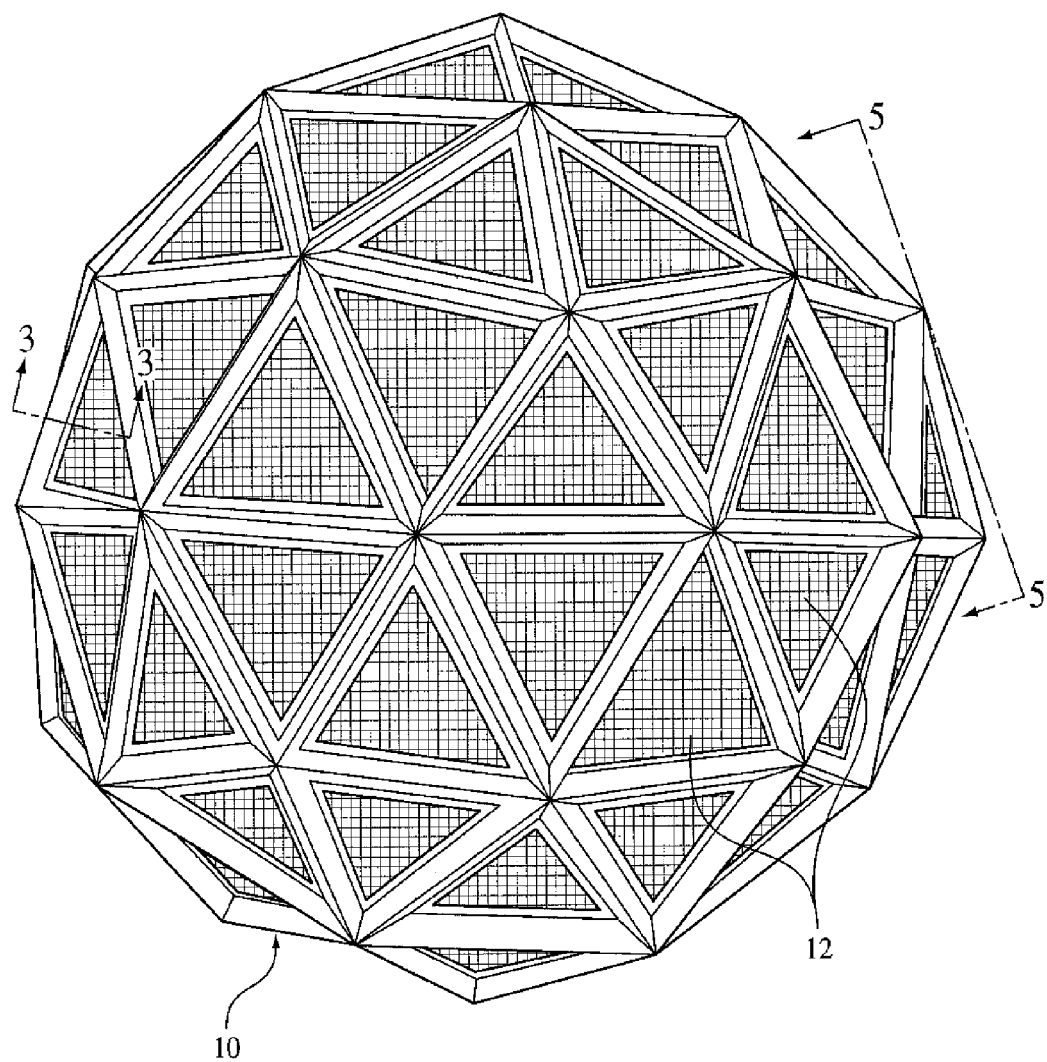
FIG. 1 is a perspective view of a polyhedral sphere. It is a 2-frequency icosahedron, which is one possible polyhedron that may be used in implementation of the invention. The figure shows the triangular panels that comprise the polyhedron.

FIG. 1 shows an implementation in which triangular panels 12 make up a polyhedral finfish containment pen 10. The polyhedral sphere 10 in FIG. 1 is a two-frequency icosahedron. It contains eighty panels, of which twenty are of a first type, and sixty are of a second type. (In an icosahedron there are twenty identical, equilateral triangular panels. In a two frequency sphere there are two types of panels, and in higher frequency spheres there are more than two different types of panel.)

Mesh as Structural Element of Panels

Figure 2:
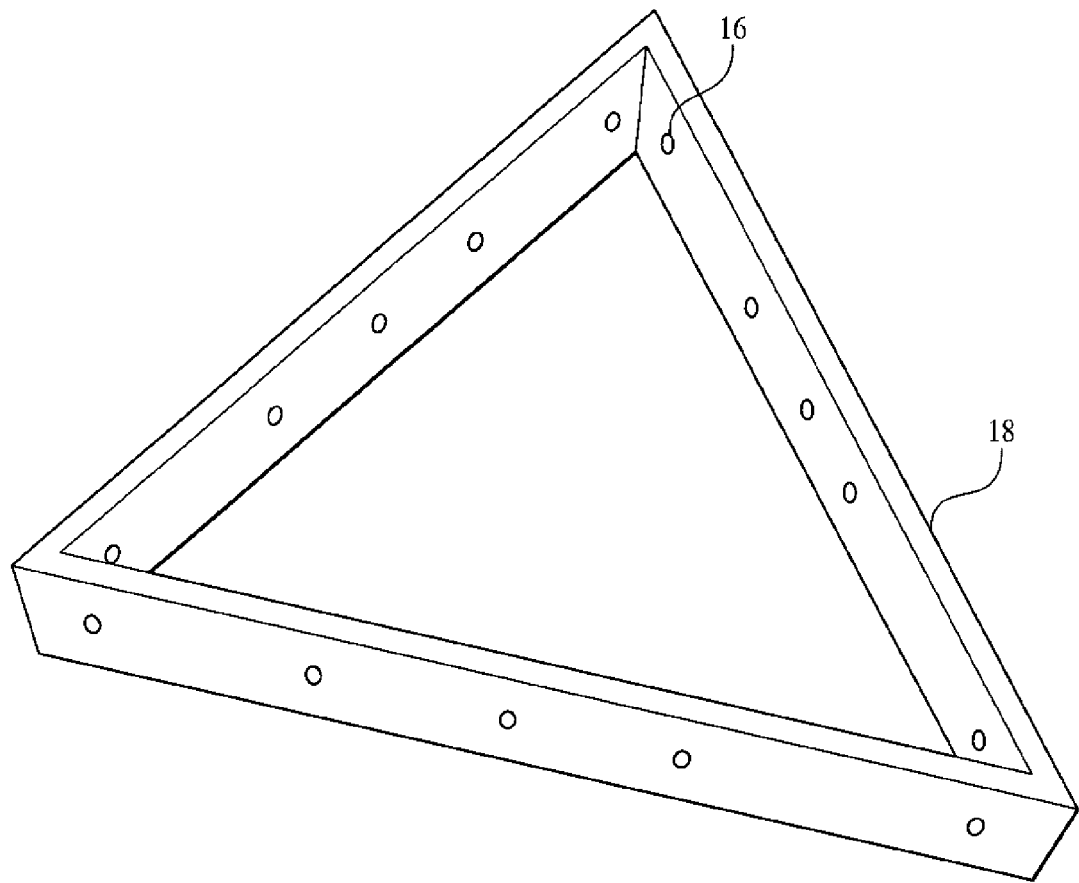
FIG. 2 is a perspective view of a single triangular panel frame that defines a planar face of the larger polyhedron, showing the placement of holes for lacing.

FIG. 2 shows a single panel, typical of the eighty panels that make up the entire sphere. The panels may be attached to one another in various ways. One possibility is a lacing arrangement in which lacing passes through lacing holes 16, which are located in the struts 18 through which lacing is passed to accomplish joining the eighty panels together to make the sphere.

The struts 18 comprising a typical panel may be made from molded or extruded high density polyethylene (HDPE) plastic or a plastic combining HDPE and polystyrene. Or the struts may be made from a variety of other materials. In a two frequency icosahedron sphere with a thirty foot diameter, the struts may have a rectangular cross-section of 1.5 inches by 6 inches. Strut elements may be fastened at the corners by welding, or with screws or other mechanical fasteners. Note that the role of these fasteners is to hold the triangular panels together before and during assembly. Once the sphere is assembled, their role is insignificant. Triangular corner gussets 1.5 inches by 14 inches on each side, of the same material, may be screwed in place to reinforce the panel corners. Alternatively, the entire panel may be molded as a unit from plastic, with its wire mesh embedded during the molding process. This latter may be best for economy and mass production.

Figure 3:
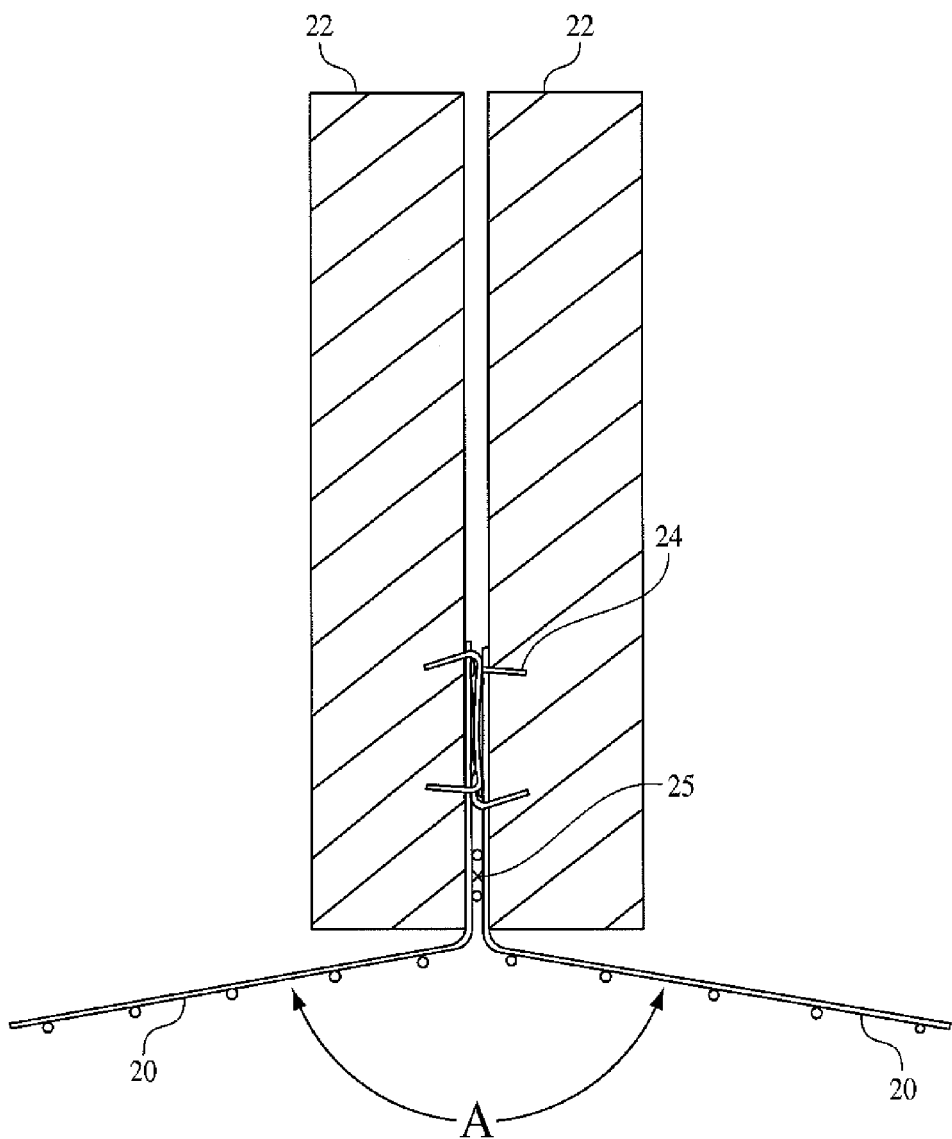
FIG. 3 is a sectional view taken perpendicular to the long axis of a representative pair of struts of a typically adjacent pair of panels (3-3 in FIG. 1). The figure shows the attachment of net or wire mesh to the triangular panel.

FIG. 3 shows how tension-bearing mesh material 20 is attached to the struts 22 of a typical panel 12 by a plurality of staples 24. The mesh material plays an important structural role (as well as a fish containment and predator barrier) in that it provides resistance to lateral deformation of the strut. Each pair of struts is laterally braced by the mesh along its length in the assembled sphere. The mesh holds the pair in tension from the nearly parallel planes of the adjacent panels of which each strut is a member. These adjacent planes form an angle A of less than 180 degrees, so that the mesh restricts deformation of the strut pair outward from the center of the sphere. Further, the mesh tends to resist compression buckling of the strut pair which acts in compression as a column. This is because compression buckling tends to occur in an outward direction in relation to the sphere's center—a direction restrained by the mesh—since the centroid of axial loading (FIG. 3, location 25) occurs on the portion of the section closer to the center of the sphere. (See further explanation in reference to FIG. 9, below).

Lacing Attachment of Panels

Figure 4:
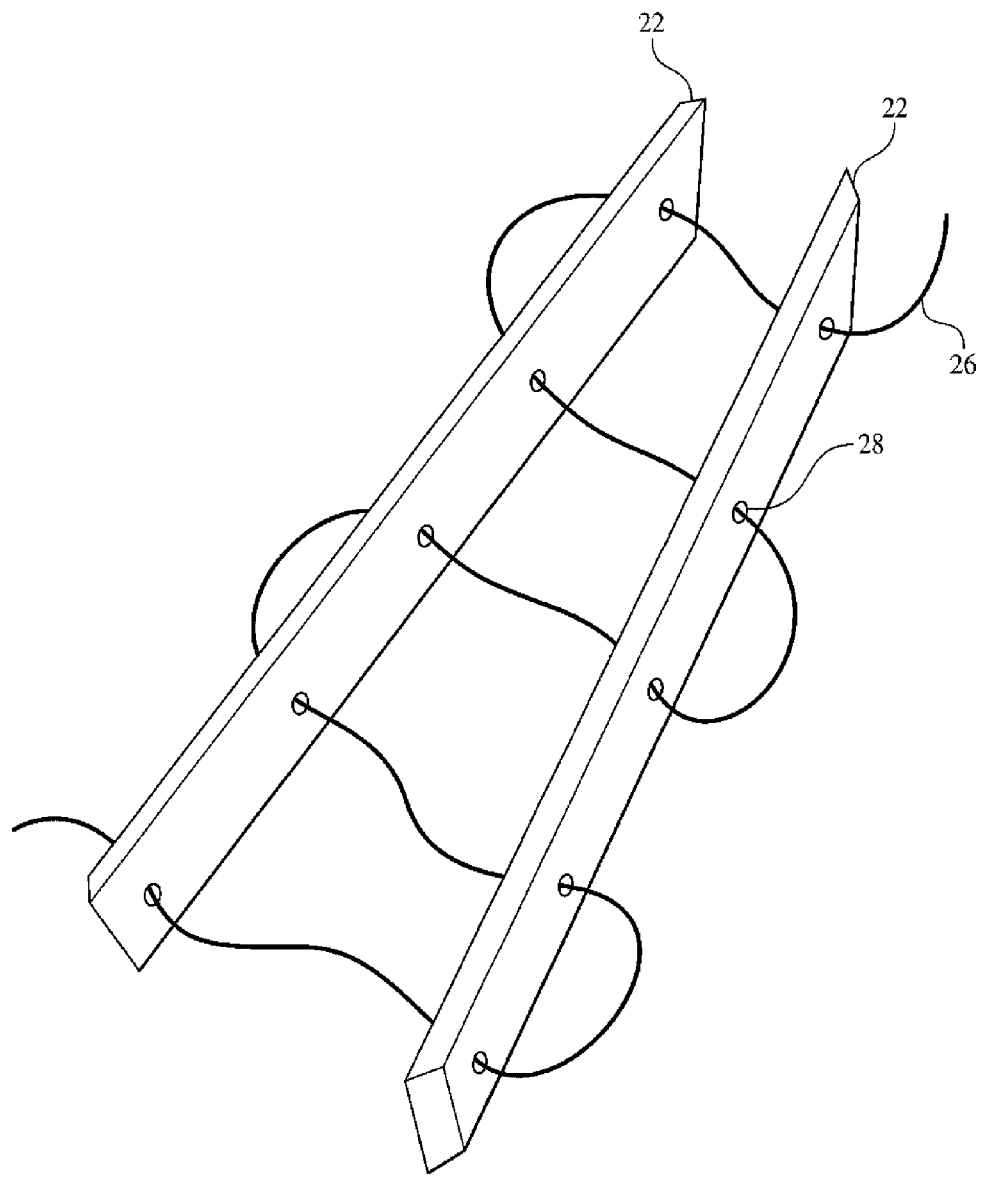
FIG. 4 is a perspective view showing how the lacing joins two adjacent struts together.

FIG. 4 shows a possible lacing pattern for joining two struts together. Lacing lines 26 (which may be any of many different possible elongated forms and materials) passes through holes 28 in the struts 22. The lacing is typically not drawn tight until portions of, or the entire, sphere have been fully but loosely laced. Tensioning the lacing brings the two (and all other pairs of) struts 22 tightly together, and typically in near-perfect alignment. Note that line passing through the several holes of a strut pair in opposite directions tends to cancel any tendency for misalignment of strut pairs, even if the holes are oversized relative to the line.

Figure 5:
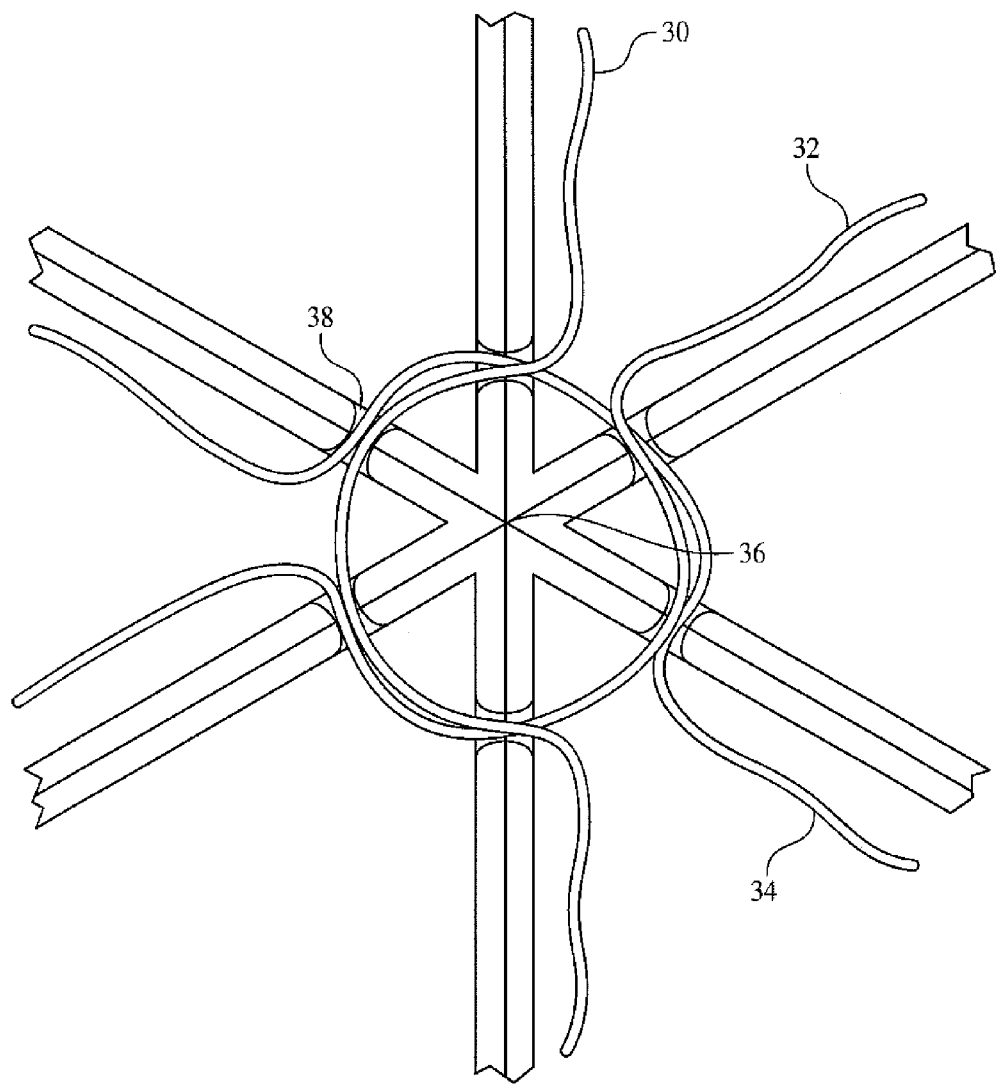
FIG. 5 is a sectional view taken through a hub intersection (5-5 in FIG. 1) showing one possible implementation of the lacing attachment at an hexagonal hub intersection.

FIG. 5 shows how a typical hexagonal intersection, or hub, is laced in a "compression ring" method of lacing. The three lacing lines 30, 32, 34 that comprise the "ring" work in opposing pairs to form a complete ring that draws the six panel corners 36 tightly together. Each line 30, 32, 34, upon reaching the vicinity of the hub, turns and follows a circumferential path halfway around the hub, passing through holes 38 in four strut pairs, until emerging and continuing along a strut pair extending in the same direction as the strut pair along which the line approached the hub. The edges of all holes 38 are rounded with a radius to reduce friction on the line where it pulls struts together and as it makes the 90 degree turns from running along a strut pair to moving circumferentially around the hub. Note that as line tension is increased, either through adjustment or due to deformation, panels are drawn ever more tightly together. In addition, because lines may slide through holes 38, tension and compression loads may be distributed, or balanced, throughout the sphere. In a thirty foot diameter sphere these lines may be one half inch diameter braided nylon line. The length of line required to lace an entire sphere is roughly equal to the total length of double strut material in the sphere. This is about one thousand feet for the thirty foot diameter sphere.

Figure 6:
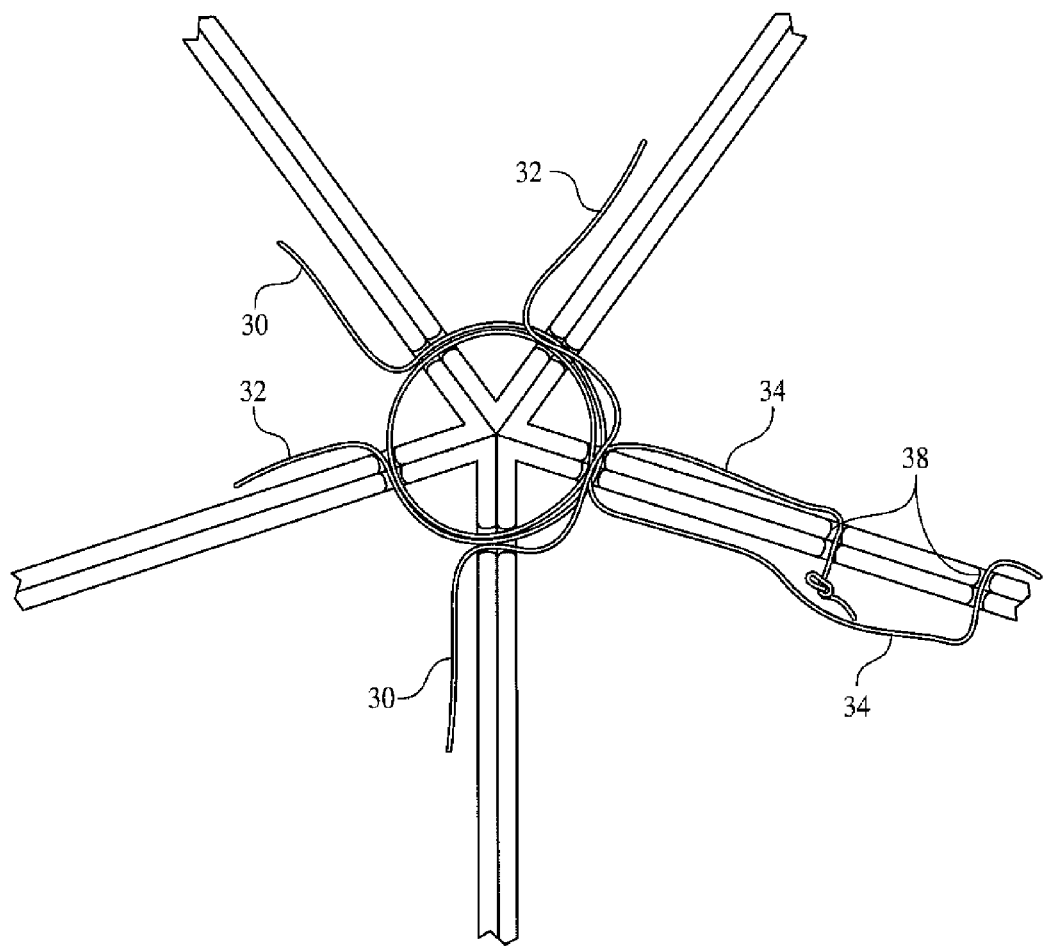
FIG. 6 is a sectional view taken through a hub intersection (section comparable to 5-5 in FIG. 1) showing one possible implementation of the lacing attachment at a pentagonal hub intersection.

FIG. 6 shows how the lacing passes through a pentagonal hub joint in the "compression ring" lacing pattern. Two of the lines (30, 32) have ends entering and departing from the hub joint along different struts. One line (34) has one end departing along a strut, and one end terminated at a hole 38 near the hub joint.

Figure 7:
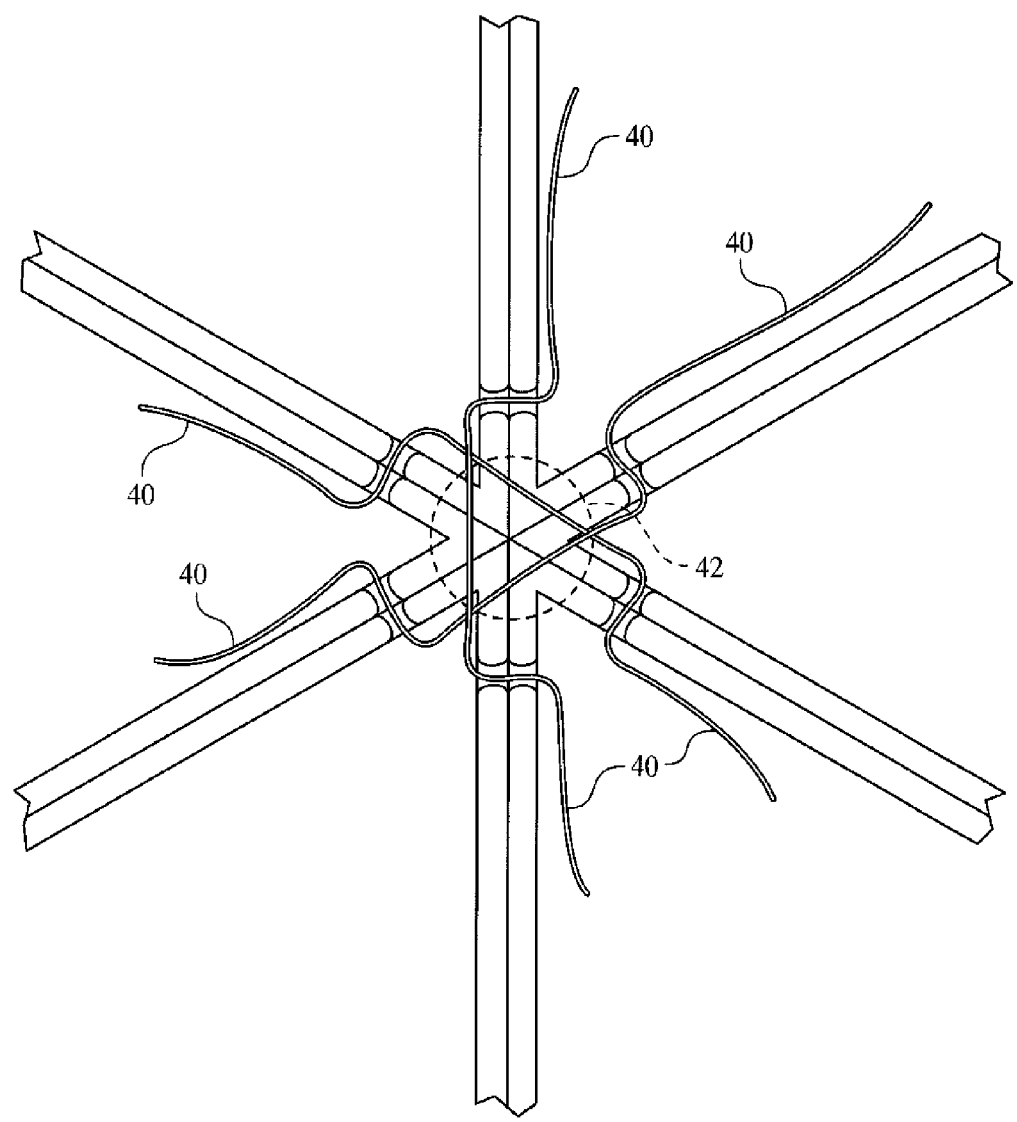
FIG. 7 is a sectional view taken through a hub intersection (5-5 in FIG. 1) showing, for an hexagonal hub intersection, another possible lacing attachment (a substantially straight line lacing pattern).
Figure 8:
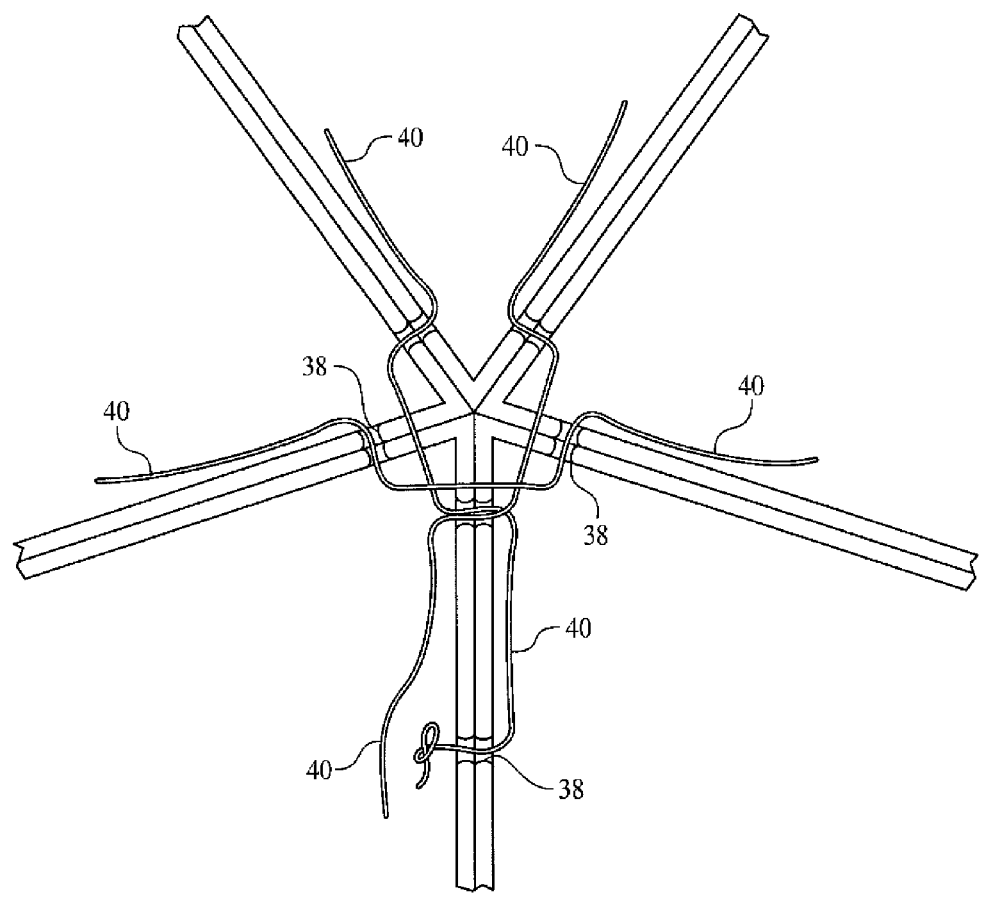
FIG. 8 is a sectional view taken through a hub intersection (section comparable to 5-5 in FIG. 1) showing, for a pentagonal hub intersection, another possible lacing attachment (a substantially straight line lacing pattern).

FIGS. 7 and 8 show another lacing pattern, known as a "straight lacing" pattern. This is an alternative to the "compression ring" lacing, and allows for the lines 40 to pass straight through the hub joints. It may also optionally allow for clamping all of the lines of a hub intersection at that hub intersection with a single clamping device 42 (shown in dashed lines for clarity). Because these lines pass straight through the hub joint, this lacing pattern tends to create a stiffer sphere. The tension is transferred more directly, and does not detour around the hubs. If or where a straight laced hub joint is clamped, it eliminates the ability of the lacing to move through that intersection. It also isolates sections of lacing so that were a lace to fail, failure would not spread. Note that numerous lines in the fully laced sphere may fail without any failure of the sphere as a whole taking place.

Figure 9:
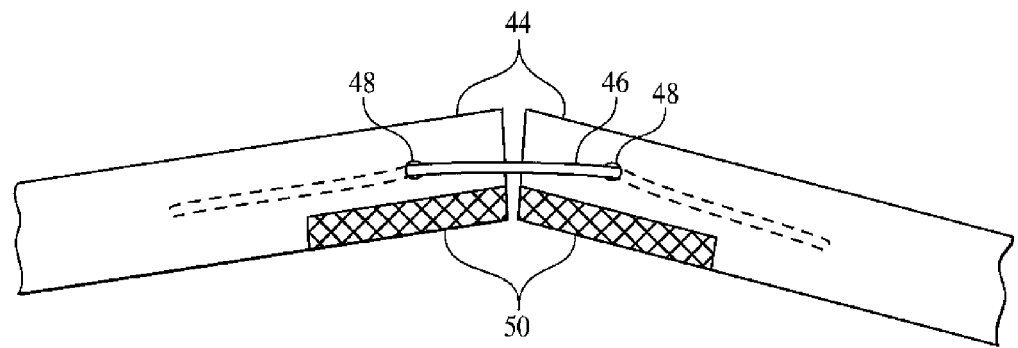
FIG. 9 is a sectional view taken along a plane through the sphere's center and the edge of a panel bisecting an hexagonal hub joint. The figure shows how the positioning of holes in the struts and the compression-bearing surfaces may work together to improve the sphere's resistance to deformation.
Figure 10:
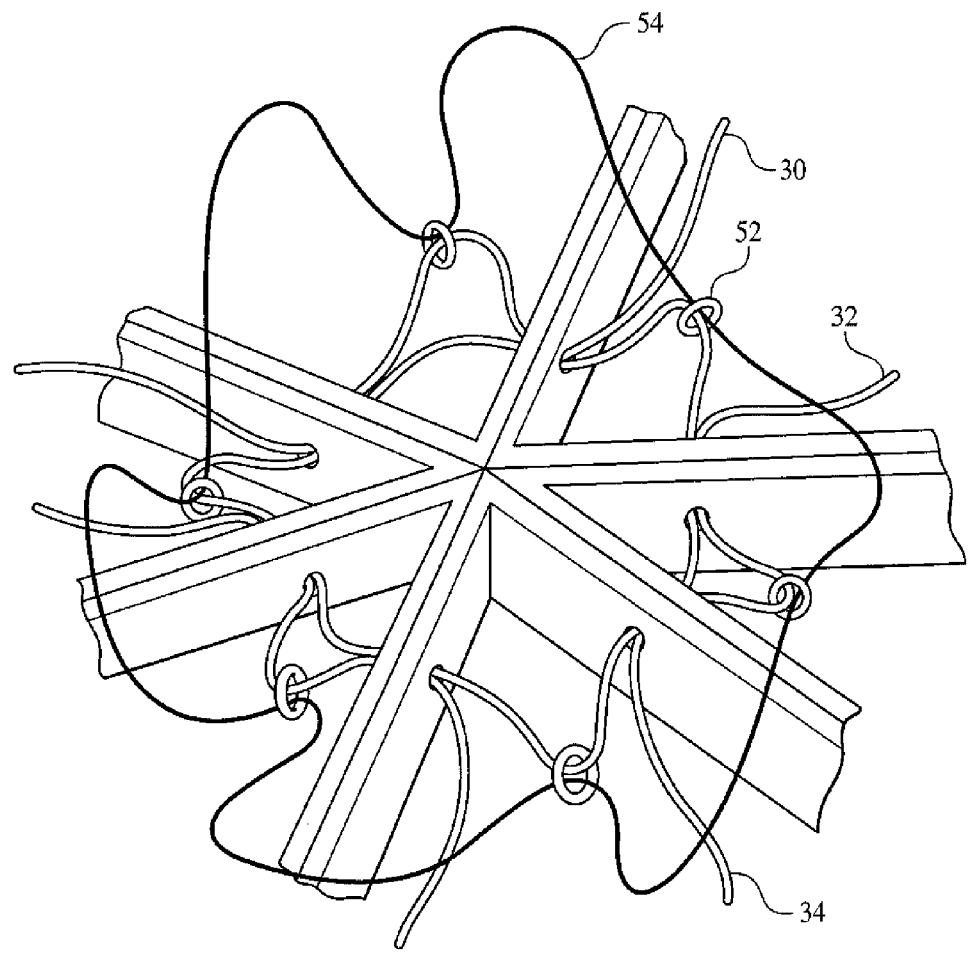
FIG. 10 is a perspective view of a typical hexagonal hub joint fitted with rings for anchor attachment. It shows how the joint's lacing pattern tightens at the joint in response to anchor tension.

FIG. 9 shows how the positioning of holes in the struts relative to the compression-bearing surfaces work to increase the resistance of the strut to deformation. The ends of two strut pairs 44 in compression are held in place by tension in the lacing 46 that passes through the holes 48 at the strut ends. To clarify how this works, assume that the corner gussets mentioned above have been employed at each corner of the panels. Assume that the very tips of all triangles have been cut away. Thus, when the sphere comes under load, at any hub that is being compressed by tension in the lacing, compression occurs between the mating surfaces of adjacent panels. The struts have little resistance to lateral bending for most of their length. The struts can resist this compression force only at the strut ends, (panel corners), where the struts are supported by the connecting gussets. Thus it is compression forces acting on both sides of every panel corner in the hub that resists deformation of the sphere. Tensile forces pass through the hub via the lacing lines in more or less straight lines, while compression is resisted by the circular arch formed by the several panel corners of the hub. Compression forces acting on the "vousoirs" of this "arch" result in an axial, columnar loading of the struts. Note that the compression bearing surfaces 50 are located at the ends of the struts and closer to the inner surface of the sphere than the holes 48. Because the axial loading is thus concentrated closer to the inner surface of the sphere the strut column tends to bend outward under load, away from the sphere's center. A slight deformation is desirable as it allows loads to be distributed throughout the sphere. As deformation occurs, the mesh attached to the strut pair (see FIG. 3) comes under increasing (though relatively minimal) tension, resisting further deformation and creating what is in effect a fully braced compression arch from the strut pair and associated mesh. This is because of the dihedral angle A (FIG. 3) between the two adjacent panels, which is always less than 180 degrees, but which may become slightly more acute as deformation occurs FIG. 10 shows one possible way that an anchor attachment location may be created at any hub laced in the "compression ring" lacing pattern. The lacing lines 30, 32, 34 are passed through the strut holes and six (or five at a pentagonal hub) anchor rings 52. An anchor harness line 54 is looped through the rings 52 and the six loops of the anchor harness line are joined to the anchor line, e.g., with a single shackle. With this attachment technique, the joint compression and lacing tension are increased in response to increasing tension on the anchor line, and the tension in all line elements may self-balance. As anchor line tension increases it is distributed in a balanced manner through the anchor harness line 54 and the anchor rings 52, because the lines are free to slide through these rings. Because tension is thus evenly distributed to the six loops of lacing lines 30, 32 and 34, tension is thus evenly distributed to the various elements of the sphere. Note that the lacing lines represented typically in FIG. 4, by line 26, are one and the same as the lines 30, 32 and 34 in FIG. 10.

Figure 16:
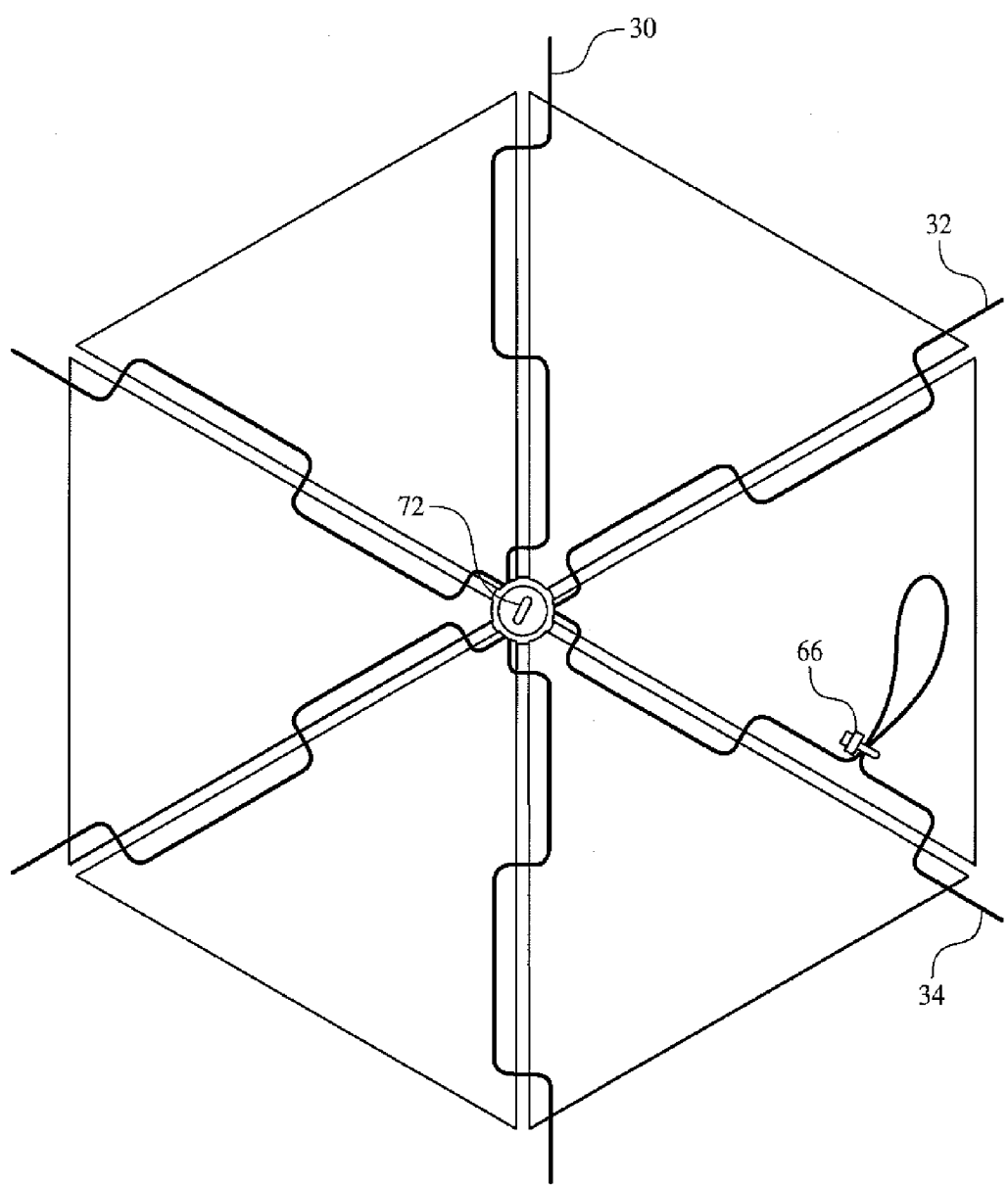
FIG. 16 is a diagrammatic view the lacing passing through struts of six representative adjacent panels and a typical hub intersection. Also pictured are line clamps and their possible locations.

FIG. 16 shows typical lacing of a hub and adjacent panel struts. It also shows one example of where hub clamps 72 and intermediate line clamps 66 may be located.

There are many ways to transport and deploy the triangular panels that make up the polyhedral sphere. One method is to lace the entire sphere together in a flattened configuration at the ocean's edge. In this method the sphere begins as a flat disc, two panels thick and about fifty percent larger in diameter than the sphere it will become (not shown in figures). This disc may be temporarily lashed together and floated (through very shallow water) to its deployment site. The lacing is then tensioned as described below, creating a full sphere.

Figure 11:
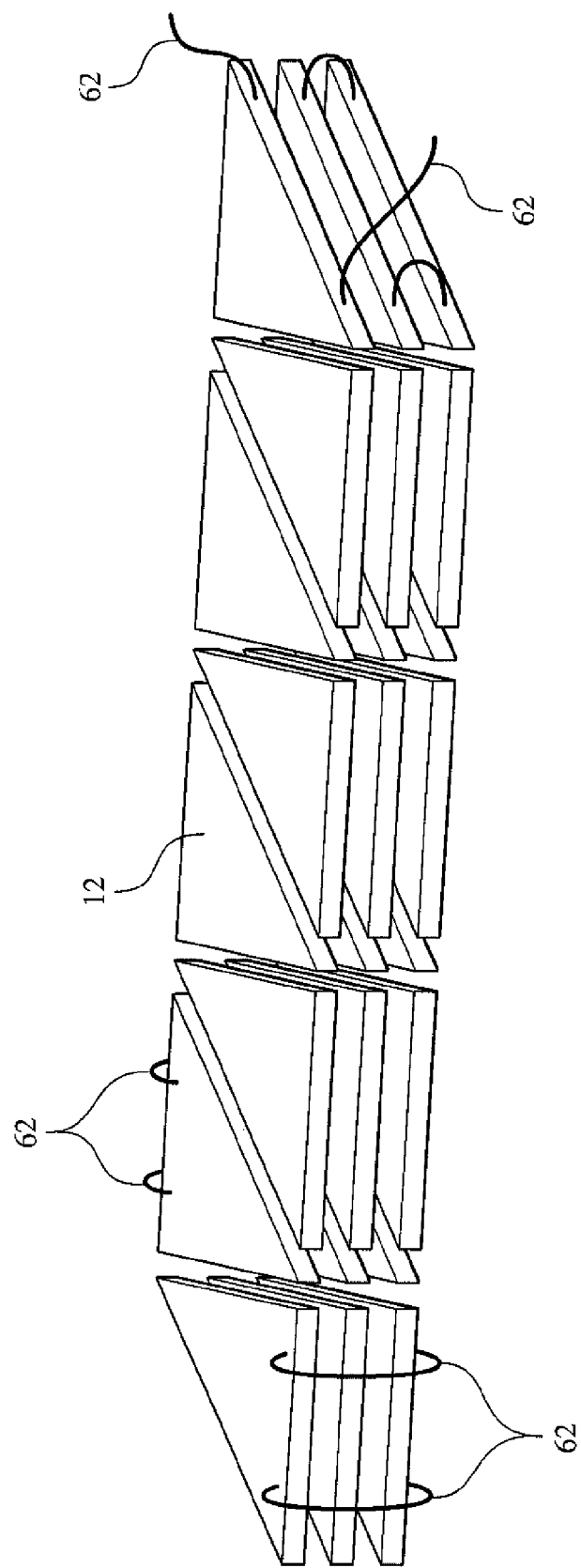
FIG. 11 is a perspective view of several panels bundled together.
Figure 12:
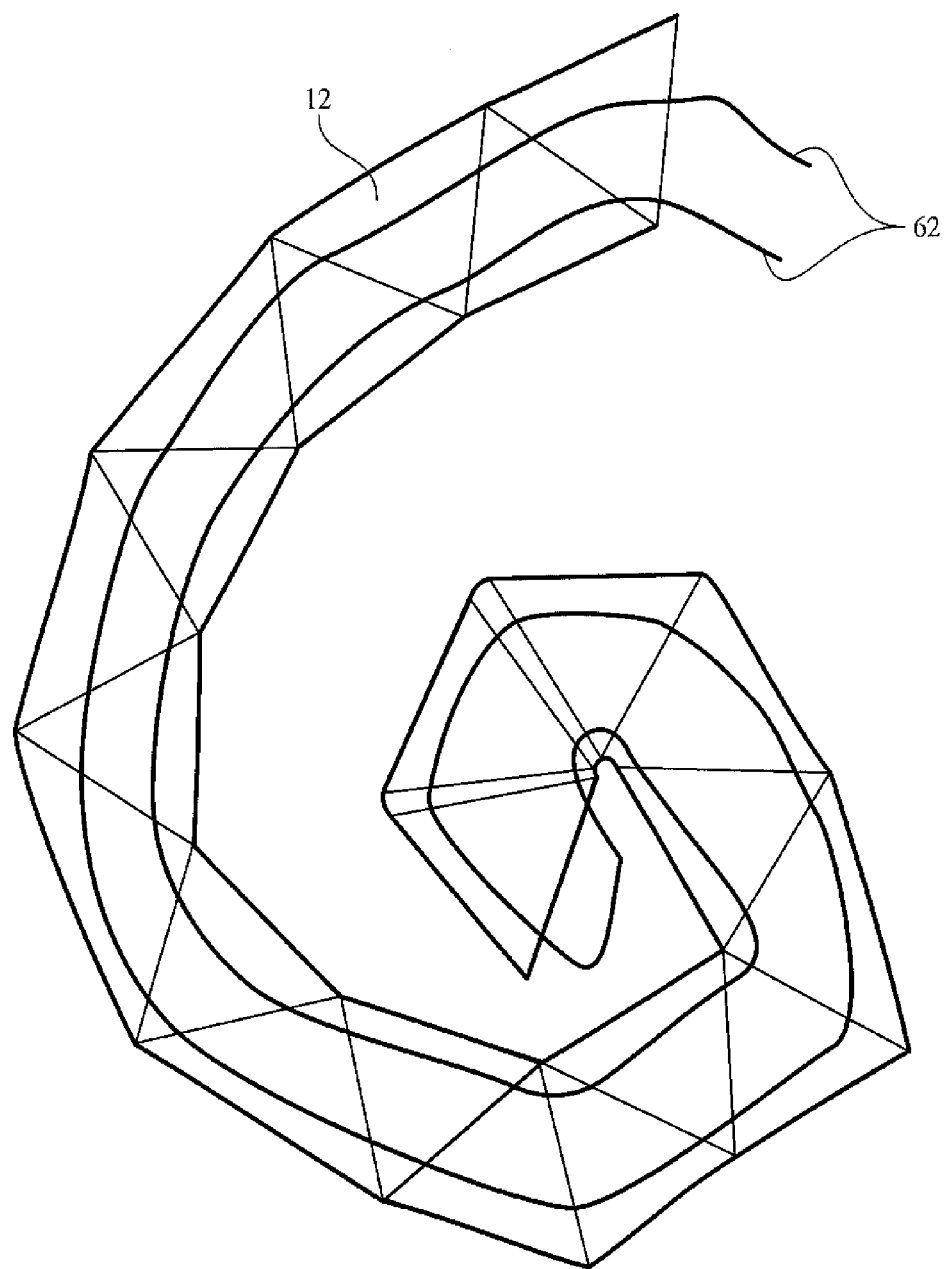
FIG. 12 is a plan view of several panels laced together.

Another method of deployment may be described as the "apple peel". In the apple peel, the panels are strung together in a long "necklace" on two lacing lines. Their arrangement on the lines is specific to their eventual position in the surface of the sphere, such that when the edges of this necklace of panels is joined continuously in a spiral, the end result will be a sphere, just as an apple's skin may be rebuilt from one long peel that has been taken in a spiral from the fruit. FIG. 11 shows how this necklace of panels may be condensed into bundles suitable for storage, transport, and connection at the site of deployment. FIG. 12 is a plan view of several panels laced together, showing the fruit-peel arrangement of panels drawn edge to edge and laid out in a single plane. The "fruit peel" is represented by the spiraling configuration of the string of panels. Two lines 62 hold the string of triangles in order. These lines 62 are temporary lacing, and serve to hold the panels in proper relation to one another prior to final lacing. In this fruit peel deployment the final lacing is all installed once the sphere has been formed by drawing tight the temporary lacing lines. Note that once the sphere is formed, it becomes relatively easy to install the final lacing since all holes are in alignment and the sphere may be rotated in the water, bringing successive portions of it slightly above the surface. To facilitate this process, or to do maintenance on the sphere at any time, a loosely inflated ball or bladder (such as an inflatable spherical mooring ball) may be inserted into the sphere. As the sphere is rotated in the water, this inflated ball will easily roll to raise any desired location on the surface of the sphere above water. This method of deployment involves transporting the bundled (condensed by folding) fruit peel to the deployment site, lacing the peel together in the water with additional temporary lacing, drawing tight the temporary lacing and then installing and tightening the final lacing.

Figure 13:
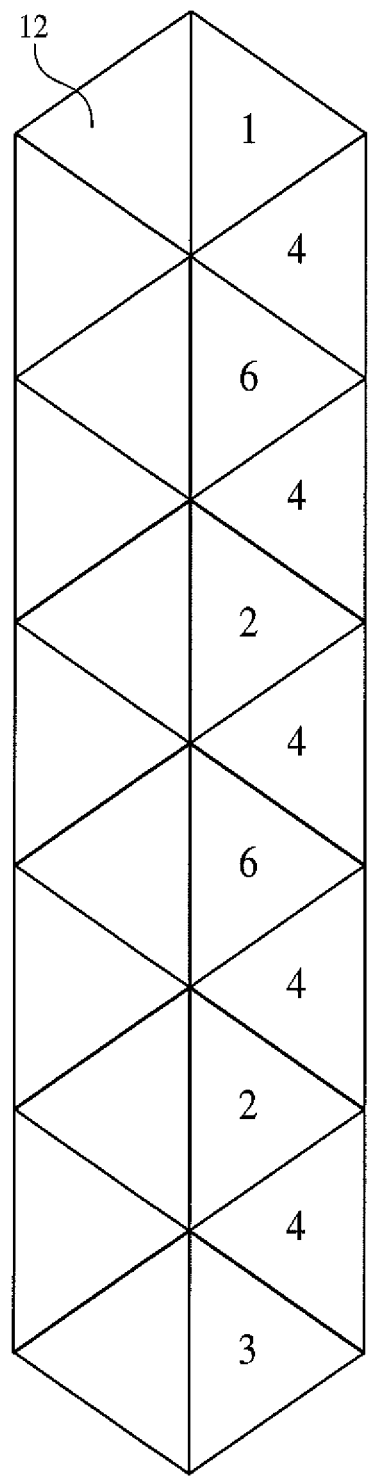
FIG. 13 is a schematic view of one half of a laced sphere with lacing slacked and the panels folded with respect to one another, so that they are organized into a specific arrangement.

A third method of deployment may be described as the "fully laced, collapsed and folded" method. In this method, the panels 60 are successively arranged as shown in FIG. 13. In this plan view of the stacked triangular panels, the numerals represent the number of panels in each pile. In this method, the entire sphere may be laced together with its permanent lacing at the launch site. For a thirty foot diameter sphere, the collapsed and folded panels occupy a space approximately fifty feet by eighteen feet by four feet. The collapsed sphere is then floated to the deployment site and the lacing drawn tight. The advantage of this method is that there is no temporary lacing and no lacing takes place in the water. Although the distribution of panels of higher geodesic frequency will differ from that shown in FIG. 13, spheres of higher geodesic frequency may be folded in this "fully collapsed" method.

Figure 14:
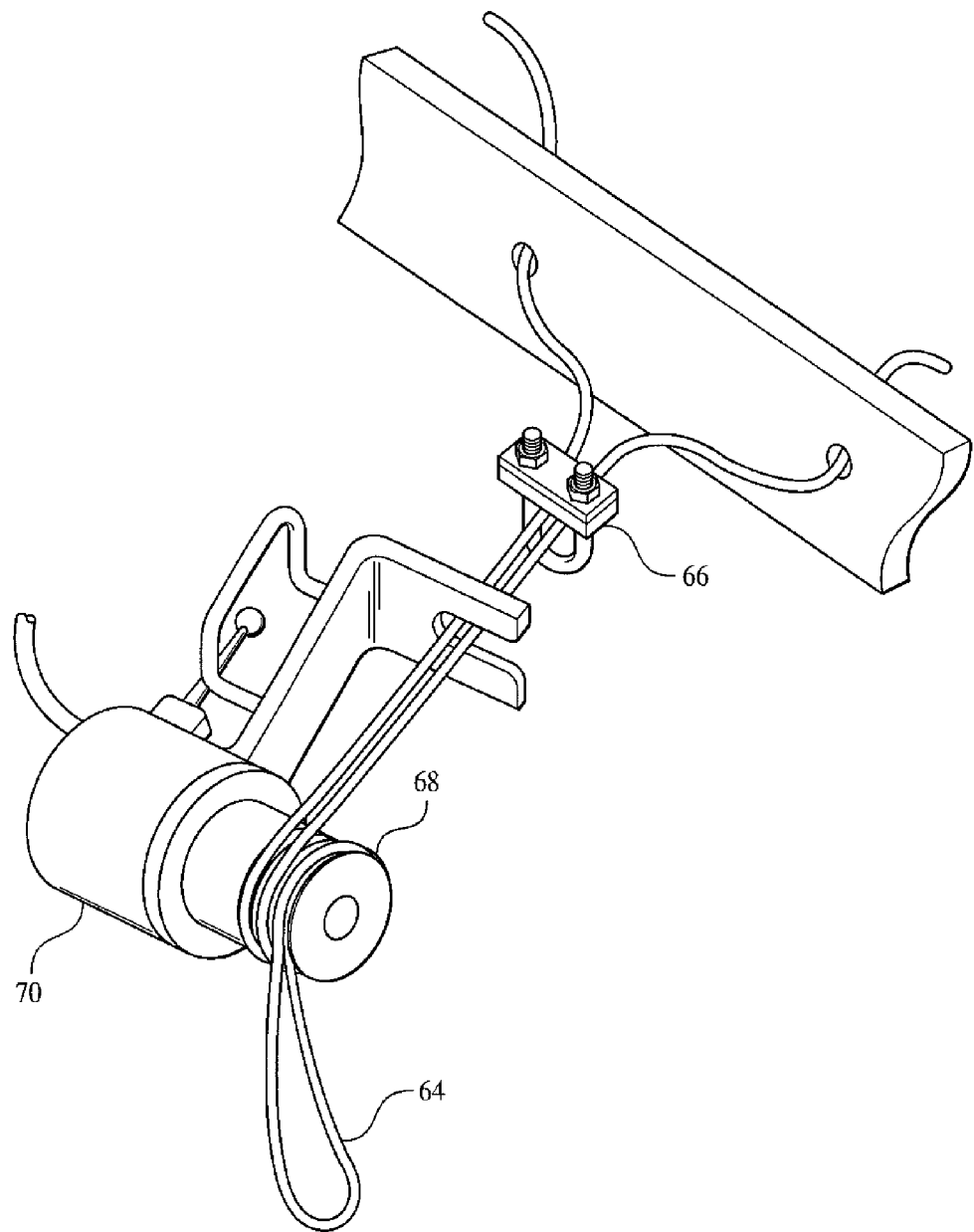
FIG. 14 is a perspective view of a special-purpose tightening winch that may be used in some implementations.

Tightening may be achieved using various procedures. One possibility is the following: FIG. 14 is a perspective view of a special-purpose portable tightening winch that may be used for tightening. A typical loop of lacing line 64 is drawn through a clamp 66, and then several times around a self-tailing winch drum 68. The winch is operated by an hydraulic motor 70, which draws tight the lacing to a pre-set tension governed by means of an hydraulic pressure valve. When the desired tension is reached, the clamp 66 is tightened, and the lacing line removed from the winch drum, freeing the winch for the next tightening operation. This loop of line may be long in the case of pre-laced deployment, and may be cut off and reused elsewhere if desired.

Figure 15:
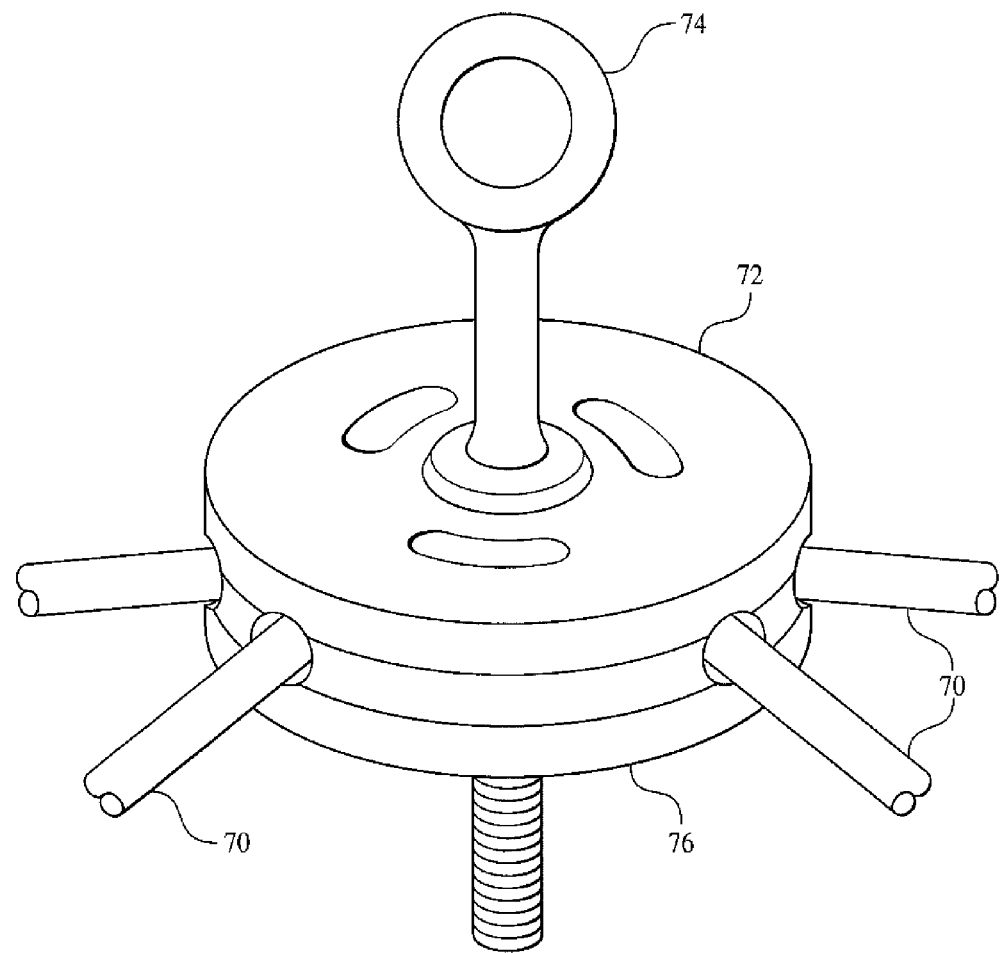
FIG. 15 is a perspective view of a clamping device that may be used in some implementations.

FIG. 15 is a perspective view of a hub clamping device for a "straight laced" hub. Three lacing lines 70 that cross the hub are captured between upper and lower halves 72, 76 of the clamping device. A ringbolt 74 is threaded through the lower half 76. When the ring bolt is loose, the lines may slide freely through the joint. When the bolt 74 is tightened, the lacing lines are locked in place. The ring of the ring bolt may be used for an anchor attachment point. This attachment provides an alternative to the anchor line harness described in FIG. 10. The upper and lower halves 72, 76 of the clamp may be made of various materials (e.g., molded plastic or stamped metal plate). If the lacing is tensioned at this hub clamp, loops of lacing from the three lacing lines may be drawn up through the three slotted holes 78 in the upper half 72. Once tension is achieved, the ringbolt 74 is tightened to clamp all lines. One advantage of the hub line clamp is that it isolates the several lines it secures so that some lines may fail without failure of the sphere. Another advantage is that it puts minimal lateral stress on the strut members. Disadvantages are that it is more expensive, that panel corners require additional shaping to accommodate it, and that it limits to some extent the redistribution of forces around the sphere.

The hub clamp may also take the form of a one-piece fairlead, with the two halves 72, 76 of the clamp shown in FIG. 15 being molded as one unit. In this case clamping of the lacing is achieved with three separate cable clamps (similar to clamps 66 in FIG. 14) on the three loops of lacing drawn through the three slotted holes 78.

The lacing line is generally considerably stronger in tension than the struts are in compression. The lacing lines can also stretch, whereas the struts are essentially non-compressible. The lacing line may be selected to balance the struts' mechanical properties so that the lines will stretch before the struts are damaged. In the 30 foot, two frequency sphere the line may be one half inch diameter braided nylon line.

Ideally, the panels comprising the sphere have neutral buoyancy. This minimizes the effect of gravity which would hinder the deployment process. Panels constructed from the plastics mentioned, in combination with vinyl coated galvanized welded steel wire mesh have this near neutral buoyancy. The density of the plastic members may be fine tuned in the manufacturing process to include more or less bubbles. Due to the molding and extruding processes these bubbles form in the core of a given cross section, so that plastic near the surface of the member remains dense and strong. While the central area of the cross section may be weakened by this design, this actually increases the column strength of the member just as a pipe section is stronger than a solid round bar containing the same amount of material. In addition, this "foaming" of the member's interior may reduce the amount of plastic material required.

In the two frequency 30 foot diameter sphere, the shape of the lacing holes 16 (FIG. 2) should be ⅞ inch (about 22 mm) in diameter to accommodate the ½ inch (about 13 mm) lacing line. The edges of the holes should have a ½ in (about 13 mm) radius. This is important because the lacing lines should slide easily through the lacing holes. Plastic lacing line slides easily through smooth, rounded holes in the plastic, particularly when lubricated by water.

Access to the interior of the sphere may be through a hatch built into a specialized panel. It is also possible to remove any panel for repair by clamping the lacing lines adjacent to it, and then cutting the lines so that the panel may be removed. When the panel or its replacement are reinstalled, new sections of line may be tied to the existing lines and tightened to secure the replaced panel. Line is cheap, line clamps are easy to apply, and knots are easy to tie.

While the implementation described above relates to a spherical fish pen, the invention may also be applied to the construction of a hemispherical fish pen that floats at the water's surface. The hemispherical pen may be used in conjunction with existing surface floating circular net support systems, replacing the net portion of the enclosure with the wire mesh covered geodesic array of panels, and using essentially the same procedures for deployment, etc.

Curved Struts

FIGS. 17 through 23 show an implementation that employs curved struts and tensile mesh panels. In this implementation a three-dimensional polyhedral containment pen has "developed" surfaces or sides. Developed surfaces are those surfaces that can be formed by shaping an initially flat sheet, and include cylindrical (circular and elliptical cylindrical) and conical curvatures. The implementation uses essentially three structural elements: one, a semi-rigid developed planar element; two, a strut or columnar element of stiff or rigid material; and three, a rigid hub piece that completes the connections between strut elements. These three components may be used to easily assemble and construct structures of a wide range of size, using a minimum of material, yet maximizing strength. The semi-rigid planar elements (of tension-bearing mesh material) are joined to and lie between the various strut elements of the structure, serving to hold the structure together by means of their tensile load bearing capacity, while the strut elements support the compressive loads within the structure. Like the strut elements, the hub pieces are also in compression. The hub pieces form a connection between the strut elements and also serve to adjust tension and compression in the entire sphere. The implementation improves the ability of the tensile mesh to strengthen the compression-carrying struts by reducing the effective column length of the struts. At the same time, it improves the load-carrying capacity of the tensile mesh by more evenly distributing the tensile loads upon it.

Figure 17:
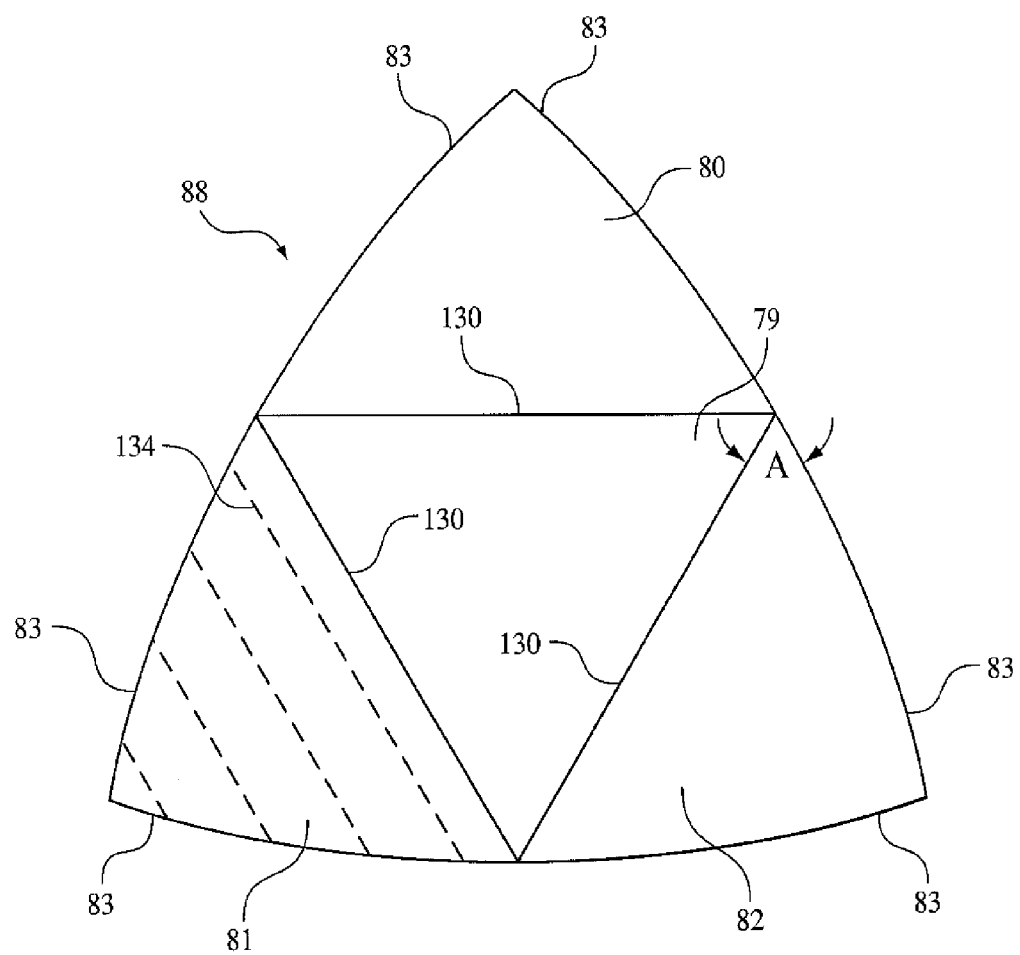
FIG. 17 is a plan view of a curve-sided triangular mesh panel, flattened to lie in a plane. It shows how the panel edges are curved in the plan view. It also shows the respective planar areas of the panel that, when the panel is applied to the sphere, will be flat or curved.

The containment pen is essentially a geodesic, triangulated polyhedral structure, the surface of which is composed of flat and developed triangular areas. FIG. 17 shows how the flat and developed areas are arranged within a single triangular panel 88, which can be made from wire mesh. As an example, in an icosahedron there are twenty such panels, all equilateral triangles. Each of the twenty triangular panels 88 comprises one triangular flat area 79 and three triangular curved (developed) areas 80. The flat area 79, which lies in the center of the face, has three straight edges 130. The three curved triangular areas 80, 81, 82, which are developed surfaces that are a portion of an ellipsoid cylinder, each have one straight edge 130 in common with the flat 79 and two curved edges 83. Edges 83 have the curved shape shown in FIG. 17 when the developed surface 82 is flattened and seen in plan view as in the figure.

A flat area together with its three abutting curved areas comprises a single "panel" of the "geodesic" structure. The curve of panel edges 83 can be chosen so that when the containment pen is formed, the panels join together to form a sphere with arched "geodesic" strut lines along all of curved panel edges 83. (Alternatively, different curvatures may be chosen, with the result that the assembled pen has a shape somewhat different from a perfect sphere. Also, in practice, the panel edges may be composed of short straight sections or segments that, taken together, form a approximately curved edge.

Figure 18:
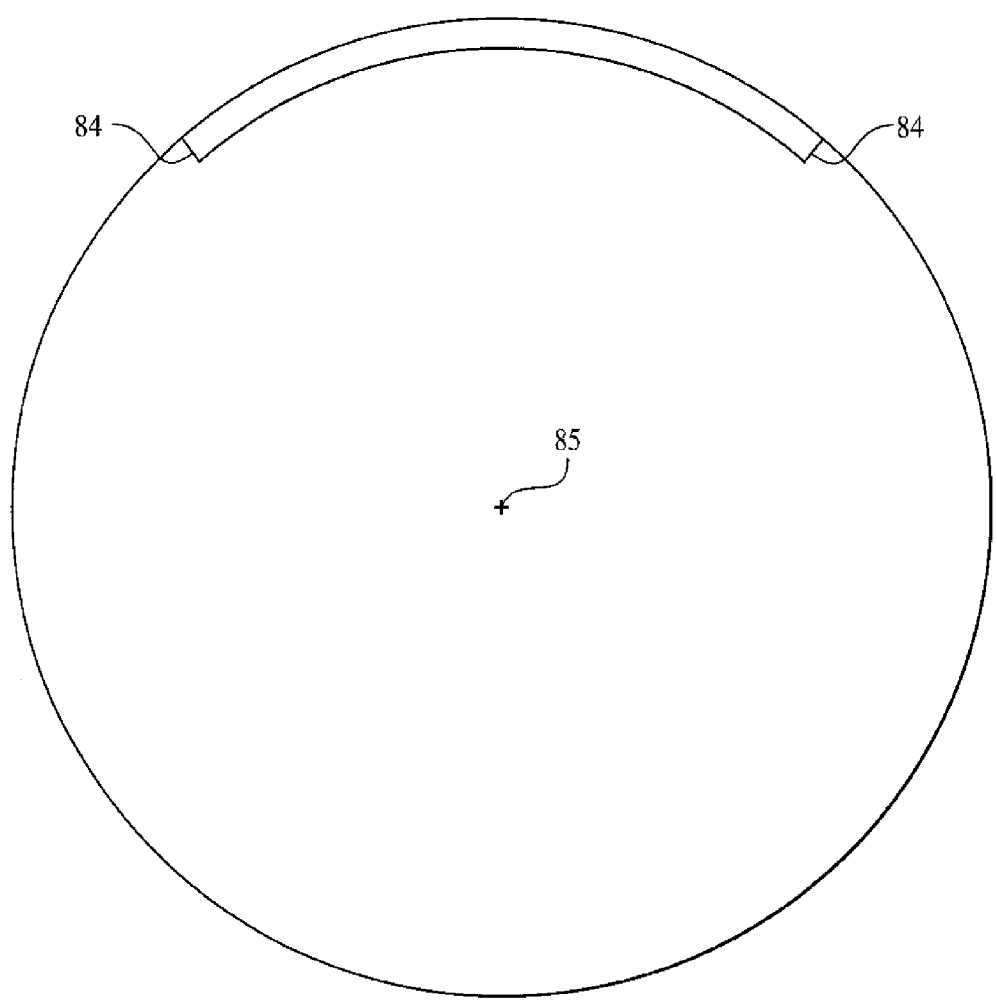
FIG. 18 is a profile view of a curved strut.

FIG. 18 shows a representative curved strut 86. Curved struts join the edges of the mesh panels 88. These struts can be curved with an identical radius close to that of the entire sphere itself, when viewed in a plane defined by their endpoints 84 and the sphere's center 85. To the degree that this radius is greater than the sphere's radius, the strut intersections, or hubs, become more resistant to external compressive and tensile loading; however, at the same time all the areas between the hubs become more vulnerable to these forces. The choice of radius is dependent on the properties and design sections of the materials used, and the nature of the anticipated localized loads, as determined by the mooring system. These arched or curved struts 86 form a three-dimensional structure that supports the compressive forces developed in the sphere due to loads imposed on it.

The triangular areas of the panels can be implemented with a sheet material having good tensile strength and stiffness, such as, for example, in the case of a three frequency eighty foot diameter fish pen, 14-gauge 1"×1" (2.54 cm×2.54 cm) vinyl-coated, galvanized, welded steel wire mesh. These sheet panels are either fastened to the curved struts along their edges, or encapsulate the strut system by being attached to each other along all edges and to the struts.

This panel sheet material supports tensile forces developed in the sphere due to loads imposed on it. These tensile loads are supported in the lateral direction (circumferential direction across the surface of the sphere) at an angle A (FIG. 17) of slightly less than sixty degrees to the long axis of the struts. In the vertical direction (along a radius of the sphere) the support is defined by the dihedral angles B (FIG. 19A) where the two panels join. This angle varies throughout the length of the strut, but is always less than ninety degrees on each side of the strut. The tensile loads are all taken by the mesh at a considerable angle (e.g., about 60 degrees) to the long axis of the struts. This is unlike the case of a conventional geodesic sphere composed only of struts, in which the tensile loads are supported axially by the struts themselves.

The tensile load distribution follows straight lines (dashed lines 134 in FIG. 17), even within the ellipsoid-cylindrical sections of the panels. It is advantageous to orient the strands of wire mesh comprising a panel to coincide with the tensile forces in the structure. Even if not oriented in this way, however, the wire mesh, welded at ninety degrees, will support the tensile loads since all panel corner angles vary considerably from ninety degrees.

Because of the curved struts and the curves in the sheet material imposed by them, generalized loads applied to the sphere tend to be supported evenly. There is very little tendency toward stress concentration.

When a localized compressive load is applied to a strut, the load is effectively and efficiently distributed to the area surrounding the load contact point. In theory, the only bending moment experienced by the strut is that between two restraining wire pairs, or a column length of one inch if 1"×1" mesh is used. The limiting factor is either the shear strength or the crush strength of the strut material. The tensile forces are distributed so evenly over the length and breadth of the panels that the load on each wire pair is small.

Every strut comprises a fully braced arch, and the whole structure would stand even if the struts were cut into very short voussoirs or blocks. However, unlike a slender stone arch bridge, which will fail under assymetrical loading, the strut is braced in three dimensions by the mesh attached to it, so that it will generally fail only if the tensile strength of the mesh adjacent to it is insufficient to support the load, or the short-column compressive strength of the strut material is exceeded.

When a localized tensile load is applied to the sphere at a hub and in line with a tangent to the sphere, much the same principle holds true, since this load becomes a compressive load along the axes of three struts at the loaded hub.

As no material is completely non-compressible, some deformation of the loaded strut and mesh panels will occur. However, the considerable curve of the arched strut means that there may be a good deal of deformation before inward buckling occurs. This arrangement means that the cross-sectional area of the struts can be reduced, and the strut length can be extended.

The wire mesh braces the strut more effectively in the lateral (circumferential) direction than in the vertical (radial) direction. For this reason, the cross section of the struts should typically be greater in the vertical (radial) dimension than in the lateral (circumferential) direction.

Connecting Mesh Material to Struts

Figure 19A:
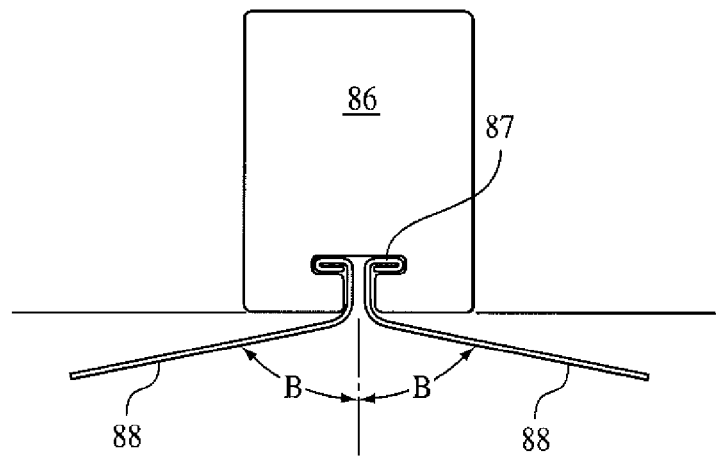
FIGS. 19A-19C are sectional views taken perpendicular to a tangent of the long axis of a representative curved strut. The figures show three possible design sections with variations of the attachment of the wire mesh to the curved strut.
Figure 19B:
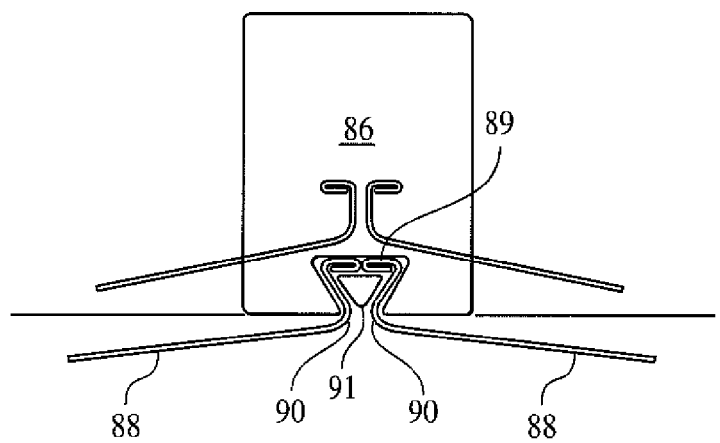
Figure 19C:
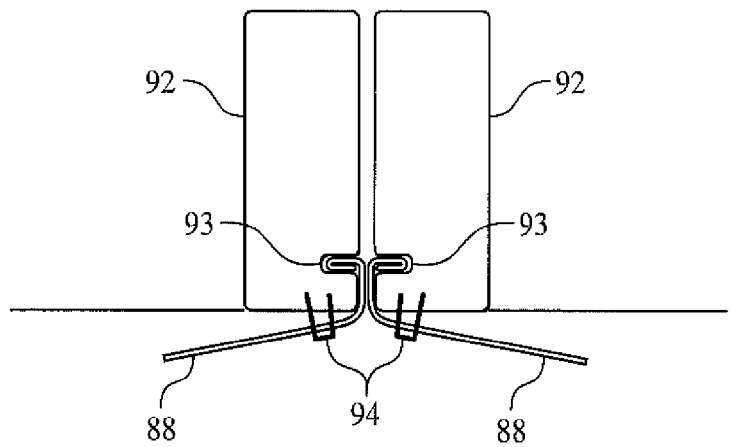

FIGS. 19A-19C show three possible arrangements for joining the edges of the mesh material to the struts at the boundaries between panels. The first method (FIG. 19A) is to form the edges of the wire mesh panels in a three-step folding process parallel to the panel edges. The first fold is made 1¼" in from the panel edge, at 180 degrees. The next fold is made 90 degrees 1¼" in from the new panel edge, and the final fold is made 1¼" in and at 90 degrees from the second fold.

The cross section of the curved strut 86 has a "T" shaped groove 87 molded or machined into its inner face, such that this groove may accept the formed edges of two abutting panels 88. The structure is assembled by sliding successive struts over the adjoining edges of panels. If the struts join at hubs with an odd number of struts, then it may be possible to slid a strut on or off of an assembled sphere. If the struts join at hubs with an even number of struts, another strut may be too close, across the hub, to permit a strut to be installed or removed on an assembled sphere, but this technique of sliding struts on will still work during most of the assembly of the sphere, as not all struts will be present at a hub.

In the second method (FIG. 19B) a trapezoidal groove 89 is formed in the struts. The struts are assembled into a sphere without the mesh. The mesh panels are then consecutively attached to the strut structure by introducing their formed edges 90, which are in this case formed in a 'Z' pattern, progressively into the trapezoidal groove 89, and then locking them in place by means of a trapezoidal retention strip 91 (or a series of segments of this retention strip) that slides into the groove, against the formed mesh edges, locking them into the strut groove. Increasing tension on the mesh results in the retention strip clamping the mesh edge ever more securely between the strip and the strut. The retention strip segments may be strung on a line so that they may be drawn into the strut groove, thereby aligning and introducing the panel edges progressively into the groove, with an action similar to that of a zipper.

In the third method (FIG. 19C), the strut is formed of two halves 92. Each half has a single groove 93 cut at ninety degrees to its mating face. Three curved strut-pair halves are fitted to a triangular mesh panel at the assembly site, and temporarily held in place by a few staples 94, along the inner face of the strut. The panels are then assembled and joined together by lace-lines as detailed elsewhere and/or bolts or other fasteners. Staples 94 are not needed after final assembly, as the mesh is captured in the grooves 93.

The curved-strut implementation may also be applied to, for example, a three frequency icosahedron modified to be comprised of two types of four sided panels. This model is created by eliminating all the struts that form the sides of the regular hexagons and pentagons included in a three frequency icosahedron. The remaining struts form the four sided, diamond-shaped panels, and the structure remains stable due to the two-dimensional stability of the mesh. There are thus only two strut lengths, and two panel types in the sphere. An advantage of this design is that any strut may be removed by sliding it along its axis through the opening provided by the space between the two opposite struts where it joins a three-way hub intersection.

In the four-sided panel implementation, any strut may be removed and replaced in this way since every strut has one end that terminates at a three-way intersection. In a 100' diameter sphere, the longest strut, minus the hub connector, will be less than 20'.

The curved-strut implementation may also be applied to a simple icosahedron on a small or large scale, or to multi-frequency geodesic spheres.

The dihedral angle B (FIG. 19A) between panels has a significant effect on the ability of the sphere to withstand localized force, and thus a lower frequency may be advantageous depending on circumstances. For a given size of sphere, as the frequency increases, so do the dihedral angles between adjacent panels, whereas the curvature of struts remains constant. Thus, at low frequency the struts form longer, deeper arches, and at high frequency the struts form short shallow arches. The longer, deeper arches are more effectively braced in the vertical plane due to the lower dihedral angles along their length. Given that all materials and joints have some degree of stretch or compressibility, the longer arches have more resistance to failure. However, if the mesh panels become too large, the mesh may not be strong enough to support the tensile loads.

This behavior of the struts and panels under loading can be explained by considering a single, curved strut together with its supporting mesh. Imagine the arc of the strut standing at ninety degrees to a plane that contains the strut ends. Draw on the plane a lenticular outline whose points are the strut endpoints. Now attach mesh along this planar outline and along the length of the strut. This forms a tent-like structure with a curved ridge pole.

A concentrated downward load applied at some point along the arc of the strut will result in axial compression along the strut and make the strut either push upward or laterally at some other location. But this upward or lateral buckling is resisted by the attached mesh.

A distributed downward load results in fairly even compression throughout the strut and in even tension in the mesh. In either case there is very little bending moment in the strut.

Curved struts have advantages over straight struts. The inherent weakness of a straight strut design is that a long, slender straight strut may fail far more readily due to compression loading either directly on the strut or from distributed loading of the adjacent mesh, because the strut must meet the load with its resistance to bending.

But as described elsewhere, concentrated compression loads applied to the hubs of straight strut designs take advantage of the curved strut design theory in that the straight strut will tend to deform outwardly under such loads, and the result will be limitation of this deformation by the associated mesh.

Expanding Hubs

Figure 20:
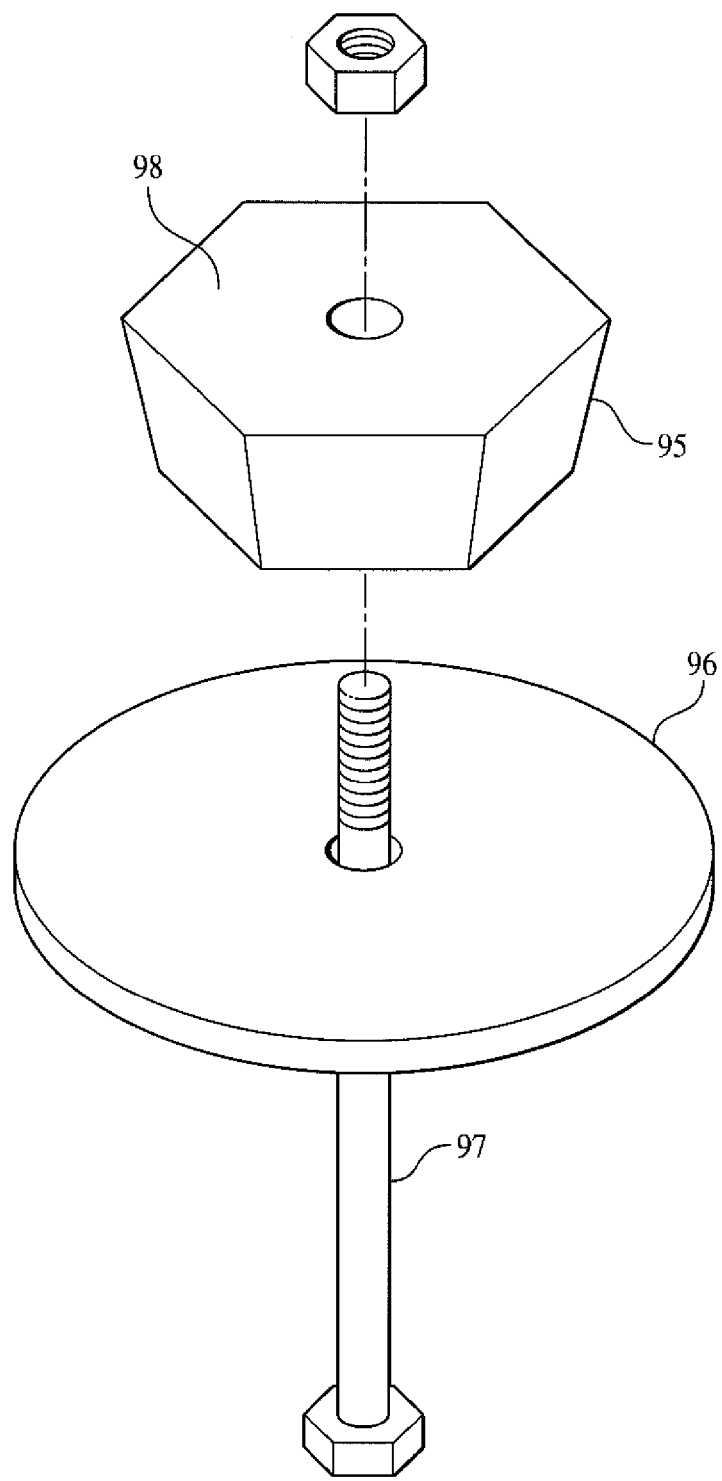
FIG. 20 is a perspective, exploded view of a "hub-lock".

FIG. 20 shows one implementation of an expanding hub for completing the hub connections between the struts. In the implementation of FIG. 20, the strut ends are cut with a single face that is nearly perpendicular to a tangent of the long axis of the strut at the strut end. If this cut were perpendicular, the sphere's center would also lie in the plane defined by it. However, the end cuts are angled such that at a hub intersection, the abutting inner edges of the struts are closer together than their outer edges.

Figure 21:
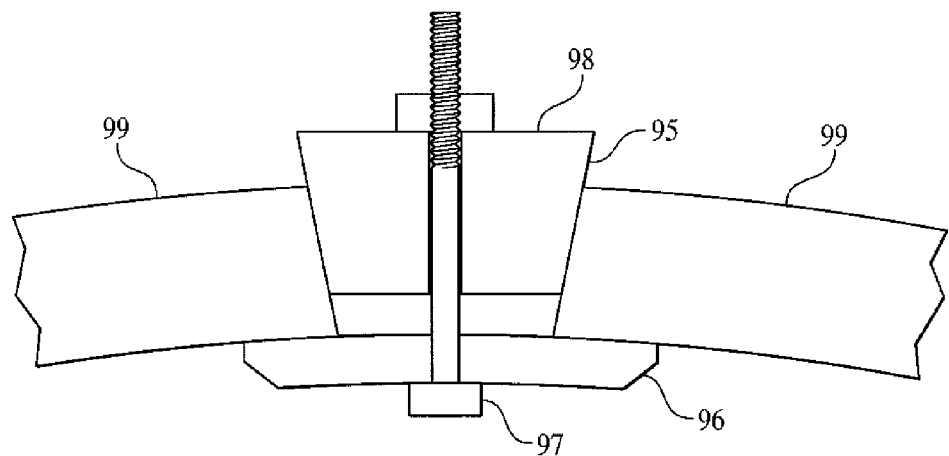
FIG. 21 is a sectional view taken on a plane defined by the longitudinal centerline of a strut at a hexagonal hub intersection. It shows how tightening the hub-lock increases the sphere's diameter.

The strut end cuts are made at a radial distance out from the theoretical hub center-line about equal to the depth of the strut section, providing a space for the connecting hub-lock. In an icosahedron there are twelve pentagonal hubs. In higher frequency spheres there are hexagonal hubs in addition to these pentagonal hubs. In the special case of the modified three frequency icosahedron (as above), some of the hexagonal hubs join only three struts. The hub-locks are shaped with five or six facets 95 that mate with the strut ends that abut them. There is a washer 96 at the inner face of the hub that overlaps the inner strut ends, and covers the raw ends of the mesh panels. A single bolt 97 through the center of washer 96 also passes through the center of the tapered hub-lock, such that when the bolt is tightened, the tapered hub-lock forces the strut ends apart radially. FIG. 21 shows the hub-lock, 98, forced against the strut ends, 99, by action of the bolt, 100, acting against the "washer", 101. The cumulative effect of tightening all the hub-locks is to increase the diameter of the entire strut structure, tightening it against the restraining mesh panels.

Thus, tightening the hubs puts the entire structure in a balance of compression and tension. This balance may be adjusted to match the physical properties of the sphere's materials, and it may be adjusted over time to take up slack.

Mooring Attachment

Figure 22:
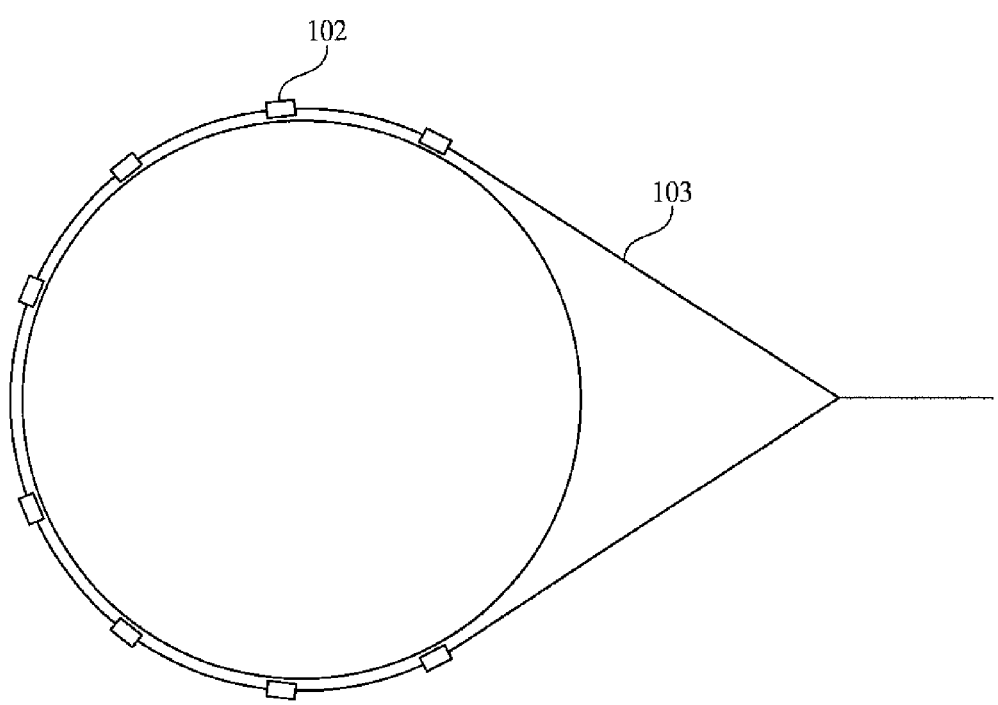
FIG. 22 is a profile view of a mooring attachment system. It shows how the tensile load of the loop mooring attachment is converted to a compressive load on the spherical fish pen.

Because the curved strut pen design is strongest in resisting compression loads, the best mooring attachment system may be one that applies primarily inward pressure on the sphere. FIG. 22 shows such a system. An equatorial ring of struts and hubs is selected and fitted with fairleads 102 at each hub located on the equatorial ring. The pen is then encircled with a loop mooring bridle 103, passing through these fairleads. This system may be set up to pull from one or more directions. It distributes the mooring load rather evenly as compression around the equator. Redundant mooring loops may be added as a safety measure.

With two mooring attachments rigged at 180 degrees to one another, all parts of the pen may be brought to the water's surface for maintenance and/or replacement of parts.

Figure 23:
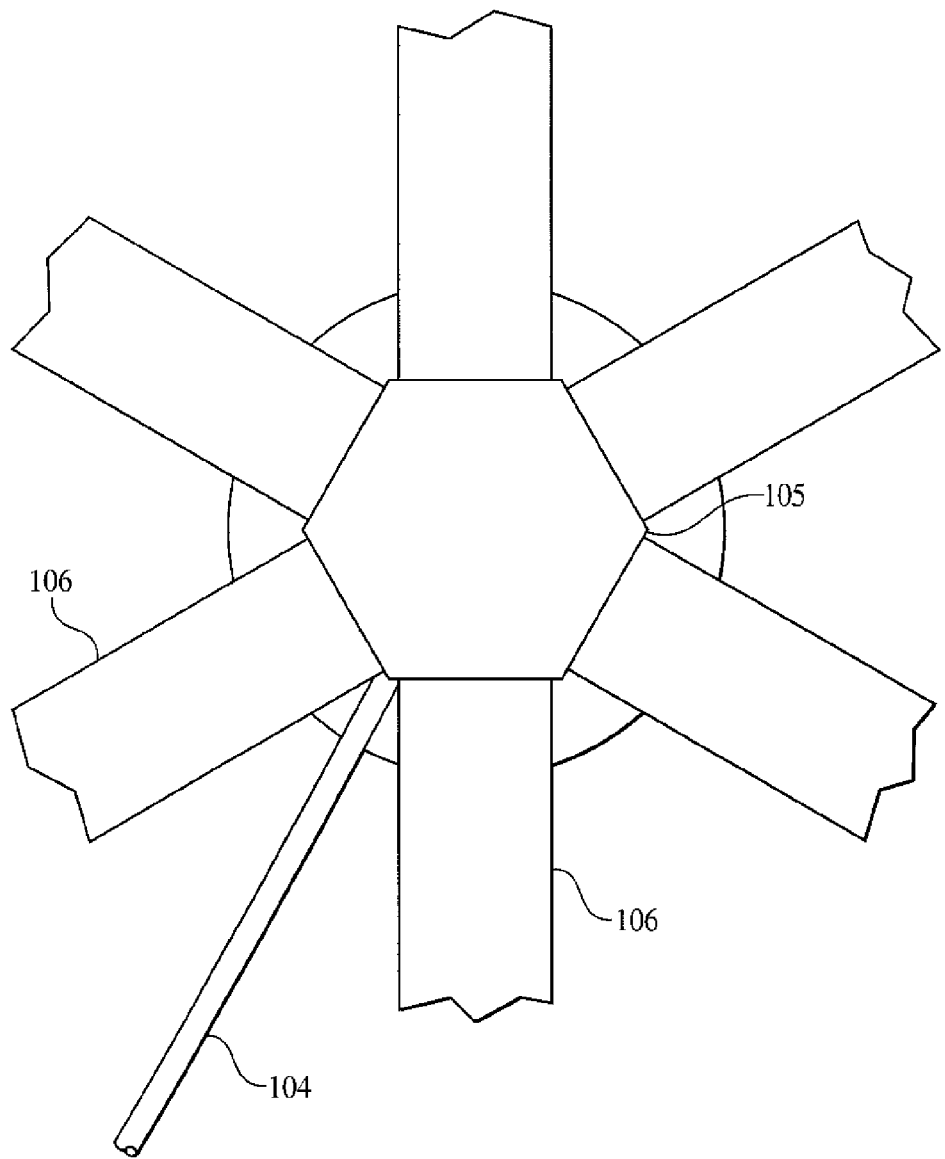
FIG. 23 is a plan view of one bridle line in an alternative, five point bridle mooring attachment.

FIG. 23 shows an alternative system for mooring attachment. Reinforcing one or more hubs as mooring attachment points allows direct attachment of mooring bridle lines to the hubs. Any mooring attachment at a hub is best made with a tangential lead. The mooring bridle line 104 attaches to the hub element 105, which may be made from a reinforced or stronger material if a mooring line is to be attached. In this way the tensile force of the mooring load is converted to a compression load on two to three of the struts 106 at the attachment hub and to tensile loads on the mesh.

An important element of the curved strut system is that the compression forces in each strut are congruent with the curving, axial centerline of the strut. In this way, these forces are passed across the hubs without stress concentration in the wire mesh.

The struts are continuously braced arches. They are most effectively braced at midspan, and become increasingly less effectively braced toward their ends. However, a concentrated load applied at a hub is supported by several arches, rather than one, as is the case at midspan.

The curve of a strut may be modified to accommodate different mooring loads. If significant compression is applied at the hubs, the ends of at least some struts may have less curvature, i.e., a larger radius. This will produce an outward bulge in the vicinities of hubs when the pen is unloaded, but these hubs will be more resistant to compression.

Other Embodiments

Many other implementations other than those described above are within the invention, which is defined by the following claims. As mentioned earlier, it is not possible to describe here all possible implementations of the invention, but a few possibilities not mentioned above include the following.

With respect to the lacing aspects of the invention, although it is preferred that lacing simply pass through holes formed in the struts, the struts could also have structures attached to them, or molded in place, for receiving the line.

The lacing lines may be simply distinct loops at each hub, joining the points of the panels at that hub. Tightening a loop of this kind at each hub in the entire sphere will complete the sphere. However, this will put substantial tensile loads on the strut material. (This design might be quite useful for stronger strut material, e.g., in land based structures.)

Lacing lines may follow many paths different from the ones shown in the figures. E.g., hybrids of the circumferential ring and straight-through lacing may be used (some lines following a circumferential path and others extending straight through).

There are many practical implementations of the lacing aspects beyond aquaculture fish pens. Some examples are in the construction of geodesic domes to cover sand/salt piles, green houses, or sports arenas. Toys and temporary shelters are other possible implementations.

In small structures, gravity does not make assembly difficult. In larger, or heavier structures, a crane may make assembly quicker and easier.

Large geodesic structures may be built using panels preformed from concrete or foamed concrete, and joined using various implementations of the invention. Wire rope lacing could pass through cast-in-place plastic tubes that form holes in the panels for lacing.

Implementations may combine the high tensile strength and flexibility of an element like wire rope with the not necessarily high compressive strength of a material like foamed concrete.

Implementations may combine the remarkable linear qualities of stone arches and suspension bridges, but in three dimensions.

Note that polyhedral structures are not necessarily spherical. There are in fact an infinite number of possible polyhedral shapes that may be assembled and held together using implementations of the invention. In may be advantageous that the structures have some convexity.

In some implementations, bolts or similar fasteners may be used in conjunction with lacing to attach panels together.

In some implementations, lines may pass through holes perpendicular to the surface of the sphere.

Lacing lines might extend across the interior of a polyhedral structure.

In many implementations, there is balancing of compression and tension forces such that many short, fairly weak compression members may be used. This tends to allow for a large structure to be built out of mass-produced units.

Many implementations of the lacing aspects of the invention, exploit to advantage that the resulting laced structure is only semi-rigid. For example in an aquaculture containment pen, the semi-rigidness presents an essentially rigid defense against marine predators, while flexing with the generalized pull of ocean currents. Or, in the case of a land based structure such as a tank or reservoir cover or a green house, flexing slightly to survive a powerful gust of wind, but also retaining its purpose useful shape.

Various techniques could be employed for tightening the lacing, including using a plurality of automatic hydraulic operated tensioning devices all around the polyhedral sphere.

The tapered hubs and panel-to-strut attachment mechanisms discussed in connection with curved struts could also be applied to straight struts.

Not all of the features described above and appearing in some of the claims below are necessary to practicing the invention. Only the features recited in a particular claim are required for practicing the invention described in that claim. Features have been intentionally left out of claims in order to describe the invention at a breadth consistent with the inventors' contribution. For example, although in some implementations, lacing is used for attaching panels, such lacing is not required to practice the invention of some claims (e.g., those directed to panels comprising tension-bearing mesh material). Also, although in some implementations, the struts are curved, such curvature is not required to practice the invention of some claims.

What is claimed is:

1. A three dimensional space enclosing polyhedral structure, comprising:
   a plurality of panels that when joined together form the polyhedral structure, the panels each including a plurality of convexly curved struts joined together to define a polygonal shape, the polygonal shape of each of the plurality of panels being configured so that a strut of one panel abuts an adjacent strut of an adjoining panel,
   the convexly curved struts configured to serve as arches to carry compression loads, and
   a two dimensionally stable sheet material attached along its perimeter to the convexly curved struts along the length of the struts of each panel of the plurality of panels, the two dimensionally stable sheet material configured to provide tensile loading and serve as lateral and vertical bracing for the arches.

2. The structure of claim 1, wherein the panels are cast or molded and are substantially one piece.

3. The structure of claim 1, wherein the structure is configured to be a finfish containment pen.

4. The structure of claim 1, wherein the panels are triangular, and comprised principally of three struts joined at three corners.

5. The structure of claim 1, wherein at least some of the panels comprise pentagons or hexagons.

6. The structure of claim 1, wherein the structure is hemispherical and configured as a finfish containment pen with the hemispherical shape generally submerged, and the open side facing upwardly.

7. The containment pen of claim 3, wherein the two dimensionally stable sheet material includes a tension-bearing mesh material.

8. The containment pen of claim 7, wherein the tension-bearing mesh material includes wire mesh.

9. The containment pen of claim 8, wherein the tension-bearing mesh material includes coated wire mesh.

10. The containment pen of claim 7, wherein the convexly curved struts are configured so that when loaded in compression the convexly curved struts tend to buckle outwardly from the interior of the pen, and wherein the tension-bearing mesh material is attached to the struts in such a manner as to resist such outward buckling.

11. The structure of claim 1, wherein curvature of the convexly curved struts approximately matches the curvature of the polyhedral structure.

12. The structure of claim 11, wherein the polyhedral structure is approximately spherical.

13. The structure of claim 3, wherein the panels are approximately triangular with approximately triangular pieces of sheet material extending across each panel, some portions of the triangular pieces of sheet material being approximately flat and some portions being developed to include a curved surface such that curvature of the curved surface of the sheet material approximately matches the curvature of the polyhedral structure.

14. The structure of claim 1, wherein deformation of the struts is limited by the tensile loads applied to the struts by the sheet material.

15. The structure of claim 1, wherein the convexly curved struts and the sheet material are configured so that the sheet material is attached to the convexly curved struts before the panels are placed in position in the polyhedral structure.

16. The structure of claim 1, wherein the polyhedral structure is a at least one of a spheroid and a geodesic sphere.

17. The structure of claim 1, wherein the polyhedral structure is a 2-frequency icosahedron.

18. The structure of claim 1, wherein at least one panel of the plurality of panels is a removable panel configured to be removable from the containment pen with the two dimensionally stable sheet material remaining attached to at least one of the convexly curved struts.

19. An apparatus comprising:
    a plurality of panels, each panel from the plurality of panels including at least three convexly curved struts joined to define a polygonal shape, the polygonal shape of each of the panels configured so that a convexly curved strut of one panel extends generally parallel to a convexly curved strut of an adjoining panel; and
    a two dimensionally stable sheet material attached along its perimeter to the at least three convexly curved struts of each of the plurality of panels,
    the plurality of panels configured to be coupleable to each other to form a containment pen for finfish aquaculture such that when loaded in compression during use of the containment pen, the convexly curved struts form structural arches and the two dimensionally stable sheet material is configured to provide tensile loading on the structural arches during use of the containment pen.

20. The apparatus of claim 19, wherein each of the convexly curved struts is configured to carry a compression load and the two dimensionally stable sheet material is configured to carry a tension load such that the containment pen is in a balance of compression and tension.

21. The apparatus of claim 19, wherein the plurality of panels are approximately triangular with approximately triangular pieces of sheet material extending across each panel, at least some portions of the triangular pieces of sheet material being approximately flat and at least some portions being developed to include a curved surface such that curvature of the curved surface approximately matches the curvature of the containment pen.

22. The apparatus of claim 21, wherein the curvature of the convexly curved struts is approximately equal to the curvature of the containment pen.

23. The apparatus of claim 22, wherein the containment pen is at least one of a geodesic spheroid or a geodesic sphere.

24. The apparatus of claim 19, wherein at least one panel of the plurality of panels is a removable panel configured to be removable from the apparatus with the two dimensionally stable sheet material remaining attached to at least one of the convexly curved struts.

\* \* \* \* \*